(12) United States Patent
Hollricher et al.

(10) Patent No.: US 10,649,189 B2
(45) Date of Patent: *May 12, 2020

(54) DEVICE FOR IMAGING A SAMPLE SURFACE

(71) Applicant: WITEC Wissenschaftliche Instrumente Und Technologie GMBH, Ulm (DE)

(72) Inventors: Olaf Hollricher, Neu-Ulm (DE); Wolfram Ibach, Ulm-Lehr (DE); Peter Spizig, Ulm (DE); Detlef Sanchen, Blaustein (DE); Gerhard Volswinkler, Laupheim (DE)

(73) Assignee: WITEC Wissenschaftliche Instrumente Und Technologie GMBH, Ulm (DE)

( * ) Notice: Subject to any disclaimer, the term of this patent is extended or adjusted under 35 U.S.C. 154(b) by 62 days.

This patent is subject to a terminal disclaimer.

(21) Appl. No.: 15/873,572

(22) Filed: Jan. 17, 2018

(65) Prior Publication Data

US 2018/0143415 A1    May 24, 2018

Related U.S. Application Data

(63) Continuation-in-part of application No. 13/580,324, filed as application No. PCT/EP2011/001837 on Apr. 13, 2011, now Pat. No. 9,891,418.

(Continued)

(30) Foreign Application Priority Data

Apr. 19, 2010 (DE) .................... 10 2010 015 428
Aug. 2, 2010 (DE) .................... 10 2010 010 932

Mar. 3, 2017 (DE) .................... 10 2017 203 492

(51) Int. Cl.
*G02B 21/00*    (2006.01)
*G02B 21/36*    (2006.01)
(Continued)

(52) U.S. Cl.
CPC ............. *G02B 21/006* (2013.01); *G01B 9/04* (2013.01); *G01B 11/24* (2013.01);
(Continued)

(58) Field of Classification Search
CPC ............. G02B 21/006; G02B 21/0032; G02B 21/0064; G02B 21/36; G01B 9/04;
(Continued)

(56) References Cited

U.S. PATENT DOCUMENTS 5,581,082 A * 12/1996 Hansma ................ B82Y 35/00
250/307
6,657,216 B1   12/2003 Poris
(Continued)

*Primary Examiner* — Jamil Ahmed
(74) *Attorney, Agent, or Firm* — Downs Rachlin Martin PLLC

(57) ABSTRACT

A device for imaging the surfaces of a sample having topography with the aid of confocal microscopy, in particular confocal Raman and/or fluorescence microscopy, comprising a first light source, in particular a laser light source for generating excitation radiation, in particular Raman radiation and/or fluorescence radiation and
a second light source, wherein the first laser light source emits radiation in a first wavelength range and the second light source emits radiation in a second wavelength range, wherein the first wavelength range and the second wavelength range do not overlap.

6 Claims, 22 Drawing Sheets

Related U.S. Application Data

(60) Provisional application No. 62/466,691, filed on Mar. 3, 2017.

(51) Int. Cl.
*G02F 1/29* (2006.01)
*G01N 21/65* (2006.01)
*G01N 21/64* (2006.01)
*G01B 11/24* (2006.01)
*G01B 9/04* (2006.01)

(52) U.S. Cl.
CPC ......... *G01N 21/6458* (2013.01); *G01N 21/65* (2013.01); *G02B 21/0032* (2013.01); *G02B 21/0064* (2013.01); *G02B 21/36* (2013.01); *G02F 1/29* (2013.01); *G01N 2021/6478* (2013.01); *G01N 2201/06113* (2013.01)

(58) Field of Classification Search
CPC .... G01B 11/24; G01N 21/6458; G01N 21/65; G01N 2021/6478; G01N 2201/06113; G02F 1/29
See application file for complete search history.

(56) References Cited

U.S. PATENT DOCUMENTS

| | | | |
|---|---|---|---|
| 2005/0259248 A1* | 11/2005 | Gip | ........................ G01N 21/49 356/239.2 |
| 2006/0109483 A1* | 5/2006 | Marx | ................. G01B 11/0608 356/609 |
| 2012/0314206 A1 | 12/2012 | Spizig et al. | |
| 2017/0061601 A1 | 3/2017 | Bryll | |

* cited by examiner

10 μm

10 μm

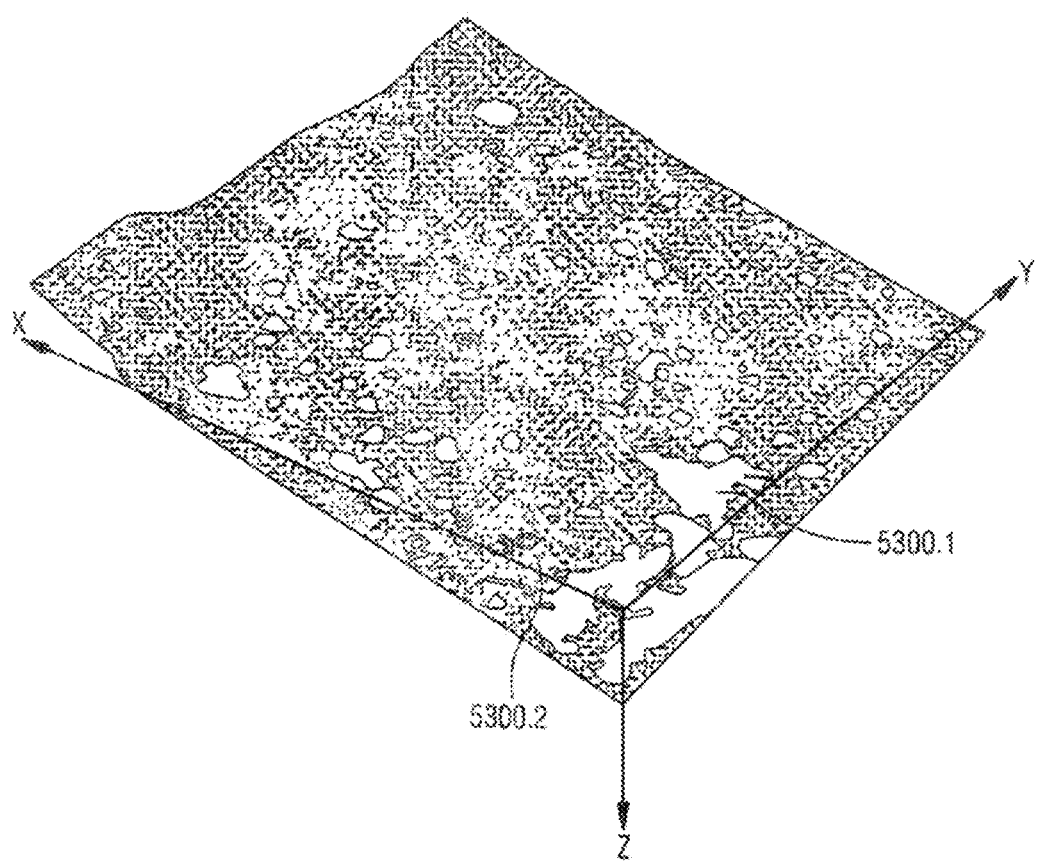

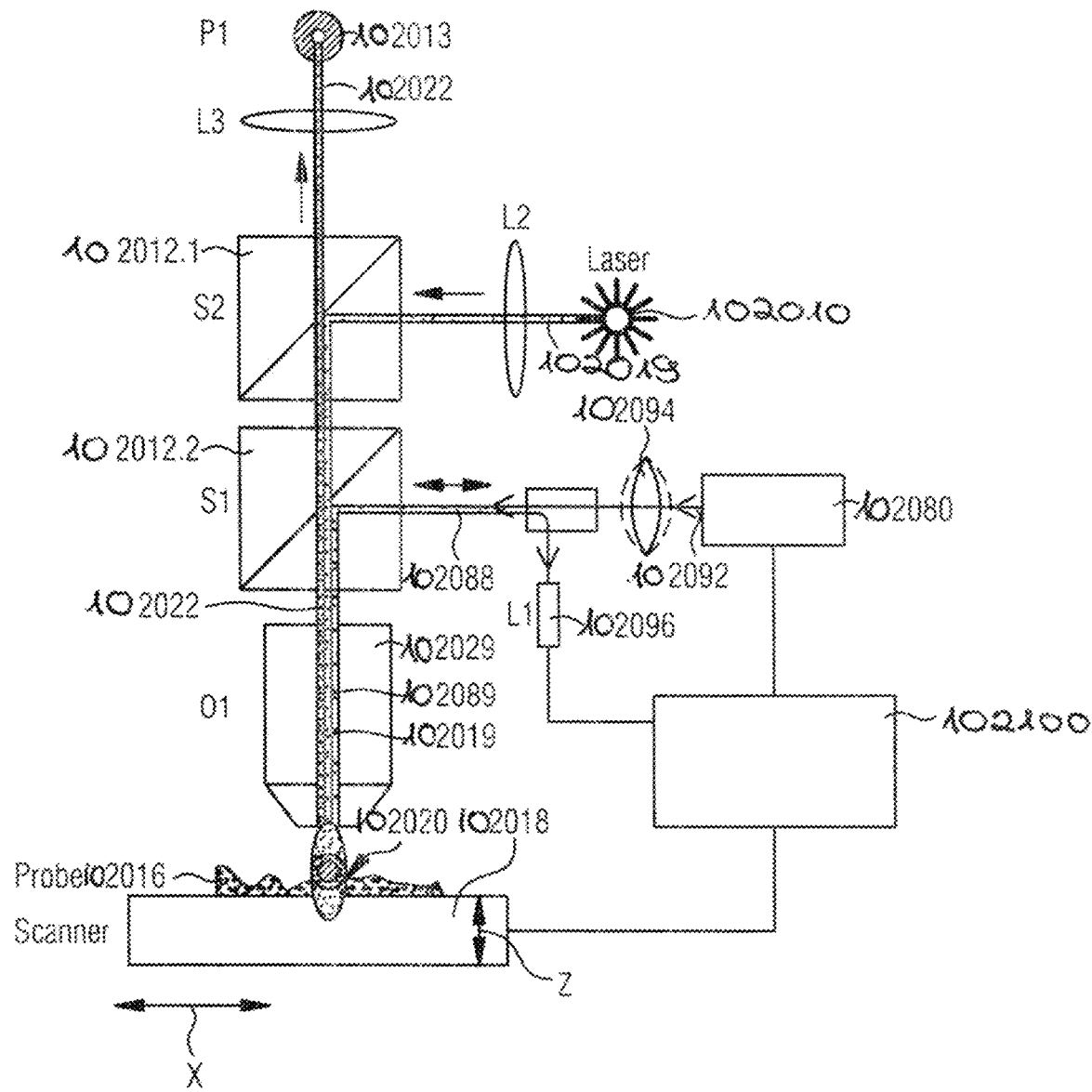

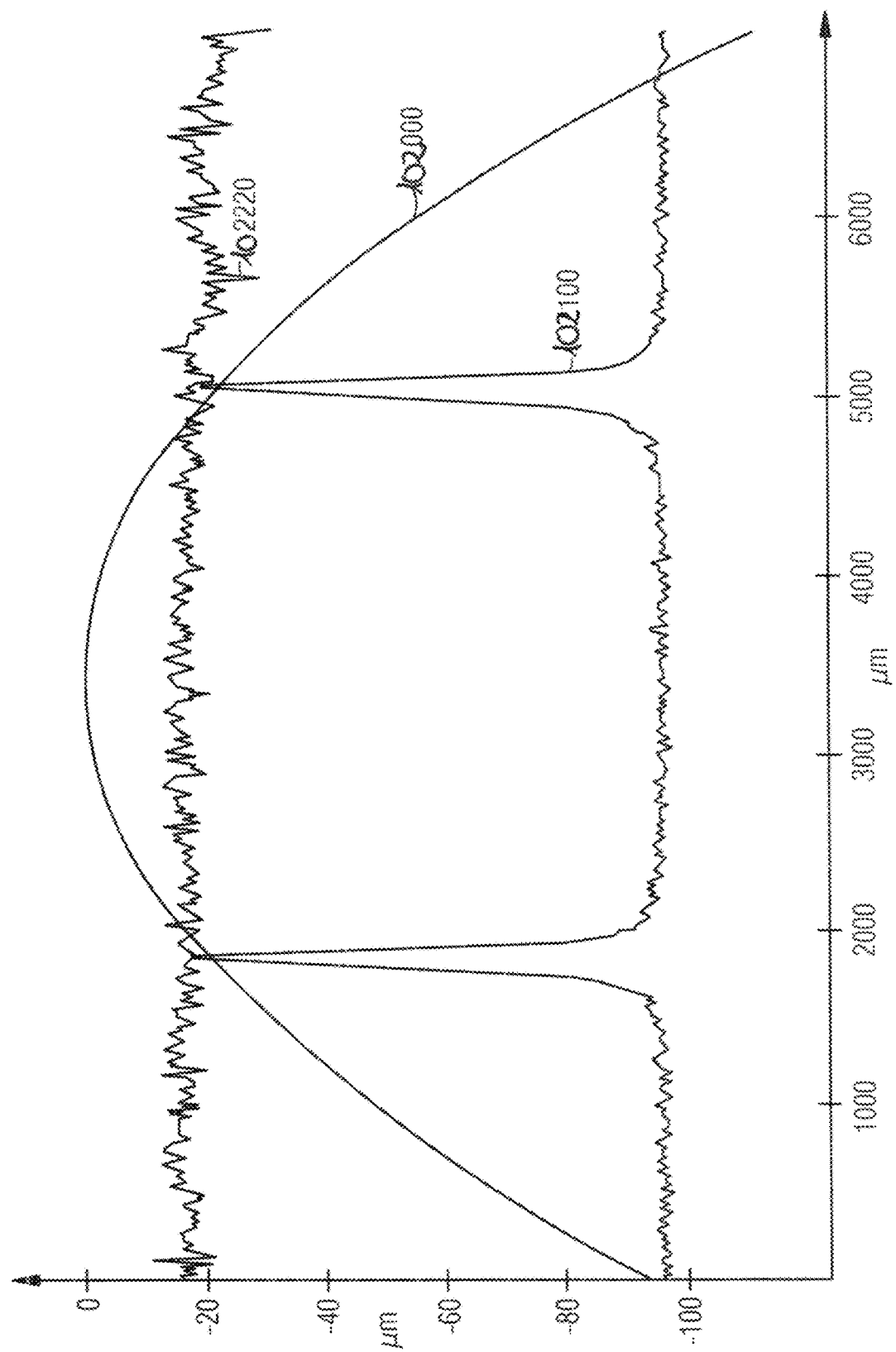

DEVICE FOR IMAGING A SAMPLE SURFACE

RELATED APPLICATION DATA

The present application is a continuation-in-part of U.S. patent application Ser. No. 13/580,324 which was filed on Aug. 21, 2012 and which claimed priority to: (a) International Application No. PCT EP11/01837, filed Apr. 13, 2011, (b) German Patent Application No. DE 10 2010 015 428.8, filed Apr. 19, 2010, (c) German Patent Application No. DE 10 2010 010 932.9, filed Aug. 2, 2010. The present application also claims priority to U.S. Provisional Application No. 62/466,691, filed Mar. 3, 2017 and German Patent Application No. DE 10 2017 203 492.0, filed Mar. 3, 2017. Each of the foregoing is incorporated by reference herein in its entirety.

FIELD OF THE INVENTION

The present invention generally relates to the field of imaging. In particular, the present invention is directed to a device for imaging a sample surface.

BACKGROUND

In many applications such as Raman and/or fluorescence measurements, confocal measurement possesses advantages since existing flare is strongly suppressed. The problem with confocal measurements or confocal microscopy is, however, that the plane or area to be imaged, especially the surface when scanning a sample, does not remain within the focal plane due to drift, sample unevenness, roughness, and tilt of the sample.

SUMMARY OF THE DISCLOSURE

The invention relates to a device and a method for imaging an area, especially the surface of a sample, in particular a sample having a topography by a scanning a plurality of regions, especially substantially punctiform regions with the assistance of confocal microscopy. In confocal microscopy, a confocal image of the substantially punctiform region of the surface is created by a detector located in the plane of the image. In particular, the invention relates to so-called confocal Raman and/or fluorescence microscopy and devices for confocal fluorescence and/or Raman microscopy, without being restricted thereto.

In addition to a device for imaging an area, especially a surface, a device is described for determining the topography of a surface that can be imaged with the assistance of confocal microscopy or confocal Raman and/or fluorescence microscopy. With the assistance of Raman measurements or fluorescence measurements, it is possible to excite a sample with a light source such as a laser light source, and image the chemically-different materials of the sample based on the Raman signal or fluorescence signal emitted by the sample.

In the case of confocal microscopy, the light from the light source on the way to the sample is conducted through a lens and thereby focused on a substantially punctiform region or point of the sample surface. At the same time, the lens can serve to capture the light emitted by the sample, especially the emitted Raman or fluorescence light, and send it to a detector.

With the assistance of the lens, it is also possible to confocally image a point or a substantially punctiform region of the sample substantially perpendicular to the direction of the illumination and/or detection beam path. If the sample, lens, or lighting is moved, it is possible to perform a scan in the x-y direction and thereby scan the entire sample. In confocal imaging, a substantially punctiform light source, preferably a laser light source, is projected onto a focus (Abbe condition) resulting from the wave nature of light, or a substantially punctiform region, ideally on a point of the sample. Subsequently, this picture element is focused preferably using the same optical system that is the same lens, on a pinhole in front of a detector. Instead of arranging a separate pinhole in front of the detector, it is also possible for the detector itself to be the pinhole. When confocal imaging is used for microscopy, the contrast of the image is substantially increased since only the focal plane of the lens contributes to the image.

In many applications such as Raman and/or fluorescence measurements, confocal measurement possesses advantages since existing flare is strongly suppressed. The problem with confocal measurements or confocal microscopy is, however, that the plane or area to be imaged, especially the surface when scanning a sample, does not remain within the focal plane due to drift, sample unevenness, roughness, and tilt of the sample.

In regard to confocal light microscopy, reference is made to DE 199 02 234 A1 in which a microscope with a confocal lens is described in detail.

A confocal Raman and/or fluorescence microscope is known from DE 102009015945 A1.

An AFM microscope or STM microscope is known from U.S. Pat. No. 5,581,082 that is combined with a confocal microscope. The sample can be scanned with the AFM tip, particularly in the z direction, using the microscope known from U.S. Pat. No. 5,581,082.

Depth information is obtained with the assistance of the AFM tip in U.S. Pat. No. 5,581,082.

During AFM measurement, in particular AFM topography measurement, optical signals are also recorded, thus allowing the topographic data obtained from AFM topography measurement to be correlated with the optical data.

In U.S. Pat. No. 5,581,082, confocal measurement is always performed simultaneous to topographic measurement. A disadvantage of U.S. Pat. No. 5,581,082 is the reduced scanning range which lies within a range of 100 μm to a maximum of 300 μm in the x-y plane. Furthermore, the AFM tip can only provide a maximum range of 5-10 μm of depth information in the z direction. A further disadvantage is that the AFM tip blocks light from the sample. A further disadvantage is that the method is not contact free.

U.S. Pat. No. 5,581,082 therefore does not permit measurements of samples in the >300 μm range and with a roughness >10 μm.

The problem with confocal microscopy, especially confocal microscopy and/or fluorescence microscopy of surfaces, especially of larger sample areas, especially >300 μm and of technical surfaces, is that imaging is very difficult since there is frequently an insufficient area of sample topography. When scanning in a given plane, a so-called X-Y scan, the sample surface continuously leaves the focal plane of the microscope, making it impossible to easily and completely image the sample surface or the sample.

The object of the invention is therefore to present a device by means of which the disadvantages of the prior art can be avoided. In particular, the invention makes it possible to confocally image a plane or area, especially a surface of a sample, i.e. with the assistance of confocal microscopy. This is also possible with samples having an insufficient flat sample topography, for example a curved sample.

According to the invention, this object is achieved in a first aspect of the invention in that a device for imaging a plane or area, especially a sample surface with a topography using confocal microscopy, especially confocal Raman or fluorescence microscopy is provided, wherein values for the topography of the surface are determined with the aid of a surface topography sensor, preferably a non-tactile surface sensor and, with the aid of the surface topography values, the area to be imaged, especially the surface, is brought into the confocal plane during scanning for confocal microscopy, especially Raman and/or fluorescence microscopy.

Determining the surface topography according to the invention, preferably with a nontactile sensor, makes it possible to remain on the surface in a subsequent Raman measurement or to measure a specific depth.

In a first embodiment of the invention (two-step method), the measured topography is saved, processed and then traced.

In a second embodiment of the invention, a control system is used to keep the sample in focus (or a plane parallel thereto) (one-step method).

The plane or area, especially surface, is imaged by means of confocal microscopy, especially Raman and/or fluorescence microscopy by scanning a plurality of substantially punctiform regions of the plane or area, especially a surface, with a device for confocally imaging the substantially punctiform region of the plane or area, especially surface, and a focal plane on a detector.

As described above, the sample can be kept in the confocal plane or focal plane in two ways when the values of the surface topography are known.

In a first embodiment of the invention (two-step method), first the part of the sample to be imaged is scanned, and the values of the surface topography are recorded and then imaged taking into account the surface topography of a sample plane. The values of the surface topography are then used in this device to move the sample such that the plane to be imaged remains in the focal plane of the confocal microscope when scanning the sample with the assistance of the confocal microscope, especially a confocal Raman or fluorescence microscope, independent of the unevenness or curvature of the sample.

In the present application, that which is understood to be the topography of a surface or a sample topography in the current application will be described as a nonexclusive example with reference to a confocal Raman microscope having a confocal chromatic sensor. The sample topography for such an arrangement having a confocal chromatic sensor is understood to be sample units greater than 1 nm, especially greater than 10 nm, and preferably greater than 100 nm.

To be understood as roughness in the present application is sample unevenness substantially in the z direction that cannot be resolved especially due to the lateral extension of the light spot of the confocal chromatic sensor. With a Raman microscope having a confocal chromatic sensor, this would be for example a surface roughness substantially in the z direction of for example less than 100 nm, preferably less than 10 nm and especially less than 1 nm, that is, the sub-µm range.

When imaging a plane, the values of the surface topography can be determined in a first step for a plurality of substantially punctiform regions of the sample, and the surface topography of the sample can be determined therefrom and, in a second step, the sample is moved into the plurality of substantially punctiform regions of the sample and, taking into account the values for the surface topography determined in step 1, into the confocal plane for confocal microscopy. This is a two-step process in which the surface topography is determined first which is followed by confocal microscopy.

In an alternative embodiment, a value is first determined for the surface topography at a substantially punctiform region of the sample, the sample is then moved into the focal plane or confocal plane of the plane to be imaged, and then this region is imaged confocally, for example with the assistance of a confocal Raman or fluorescence microscope. The entire sample can be scanned in this manner. This type of device is characterized in that:

The sample is the first moved to a substantially punctiform region while scanning, a value is determined for the surface topography, and the sample is moved into the confocal plane with the value for the topography, and the substantially punctiform region is imaged;

After imaging the substantially punctiform region, the sample is moved to another substantially punctiform region in a second step, another value for the surface topography is determined there, the sample is moved into the confocal plane with the additional value for the topography, the substantially punctiform region is imaged, and these steps are repeated until at least part of the plane or area, especially surface, has been scanned.

It is particularly preferable when the values are determined for the surface topography with the assistance of a surface topography sensor, especially a non-tactile surface topography sensor, for example a confocal chromatic sensor.

Although for example a confocal chromatic sensor was cited in the present case as the surface topography sensor, the invention is not restricted thereto.

Surface topography sensors can be any kind of contact-free (nontactile) or contacting (tactile) sensors by means of which information can be obtained about the topography of a sample surface.

Examples of tactile sensors are e.g. surface topography sensors that are termed so-called profilometers or stylus instruments. Examples of contact-free or non-tactile sensors are substantially optical sensors, surface topography sensors based on a white light interferometer, a triangulation sensor or a laser scanning system, or the described confocal chromatic sensor.

A confocal chromatic sensor is distinguished in that the light is imaged at different wavelengths in different focal planes upon irradiation with white light. If the reflected light imaged in different focal planes is imaged on a spectrometer through a pinhole and evaluated with the assistance of a spectrometer, the distance e.g. from the confocal chromatic sensor to the surface of the sample can for example be determined from this signal, and the surface topography can be determined thereby.

The fact is exploited that the wavelength of the focal plane in which the sample surface is located manifests a maximum intensity in a spectrometer. Each wavelength in the spectrometer can therefore be assigned a sample distance. With the assistance of the confocal chromatic sensor, it is therefore possible to quickly and directly determine the topography of the sample purely by optical means.

The confocal chromatic sensor makes it possible to optically determine the sample surface topography and hence scan samples and confocally image the sample surface even when the topography is not sufficiently flat.

It is possible to track the focal plane or confocal plane and thereby use confocal Raman microscopy even when the sample topography is distinct, i.e., not flat, with the assistance of the confocal chromatic sensor, for example using a Raman microscope. In one particular embodiment, a position signal of the surface topography sensor is used to control the confocal plane or focal plane. It is particularly preferable for the confocal chromatic sensor to comprise an optical system, especially a lens system having a large chromatic error. With a lens system, a chromatic error or chromatic aberration is understood to be an error that is caused by the wavelength dependency of the refraction index of the material used for the lenses. Instead of using lenses as the optical component to generate a large chromatic error, diffractive components can be used as the confocal chromatic sensor. Given the wavelength dependency of the diffraction index of the glass of the refractive component, the focal length also depends on the wavelength, that is, the confocal plane lies at different locations for different wavelengths.

In regard to confocal chromatic sensors, reference is made to the confocal chromatic sensors of Micro-Epsilon Messtechnik GmbH & Co. KG, Königsbacher Straße 15, 94496 Ortenburg, Germany (www.micro-epsilon.de), the entire content disclosed by the website being included in the application. Confocal chromatic sensors are particularly suitable for measuring distance with a resolution within a range greater than 1 nm to 1 μm, preferably greater than 1 nm to 100 nm, since they do not have to be refocused due to their high measuring precision and simultaneous large measuring range that extends for example from 100 μm to 40 mm, especially from 120 μm to 21 mm, and most preferably from 40 μm to 12 mm. The size of the light spot in the x-y plane preferably ranges from 0.1 μm to 1 mm, preferably 7 μm to 150 μm, in particular 10 μm to 100 μm, depending on the measuring range, and it has large working distance of greater than 100 μm to 200 mm depending on the sensor.

As described above with reference to the first device, the sample surface can first be measured in a two-step process with a confocal chromatic sensor, and then this topography can be traced in a confocal optical measurement, for example with confocal Raman microscopy. A predetermined plane of a sample such as the surface can thereby be confocally imaged.

The light of a non-monochromatic, preferably broadband light source is guided through the refractive lens system of the confocal chromatic sensor as a light spot to the substantially punctiform region of the sample surface where it is reflected by the sample, and collected and evaluated with the assistance of a spectrometer, and the wavelength with the focal plane in which the sample surface lies manifests a maximum intensity in the spectrum. The non-monochromatic, preferably broadband light source is preferably a white light source, that is, a broadband light source within the visible wavelength range. Broadband light sources would also be possible that do not emit visible light, for example in the IR wavelength range, or in the ultraviolet wavelength range. Illuminating the sample surface in this way would make it possible to decouple the beam paths from the confocal chromatic sensor and e.g. Raman microscope and use the same lens for the chromatic sensor and for the Raman measurements using the Raman microscope.

This makes it possible to determine the distance from the sensor to the sample surface with the assistance of the spectrometer since each wavelength can be assigned precisely one sample distance.

In addition to determining the values of the surface topography with the assistance of a confocal chromatic sensor, other options are also conceivable. For example, it would also be possible not to determine the surface topography with the assistance of a confocal chromatic sensor; instead, the sample could also be periodically moved e.g. in the z direction. The sample would therefore be periodically moved through the focus in the z direction. By periodically moving the sample, an average in the direction perpendicular to the sample surface, i.e., in the z direction, can be obtained and hence an increasingly sharper image of the sample surface with a relatively even intensity. This device has also been termed an extended focus device. It is however necessary to adapt the modulation depth of the movement to the roughness or topography of the sample.

Moving the sample to determine the focus as described above, so-called extended focus measurement, can also be combined with automatic focus tracking. The center of the modulation, i.e. the periodic movement, is tracked in the z direction so that an excessively large modulation depth does not have to be chosen for very rough samples. The fact is exploited that the focus of the light source moves through the surface during modulation. The signal that is detected is similar to a Gaussian curve with the location of its maximum corresponding to the ideal focus on the surface.

If the position of maximum intensity is sent to a controller, the center of the modulation can be tracked. The topography of the sample can be determined by using this type of measurement since the maximum intensity of the modulated signal corresponds to the sample topography.

The movement of the sample in the z direction to compensate for surface roughness can also be superimposed on the tracking of the sample with reference to the surface topography determined with the assistance of a confocal chromatic sensor. Combining both devices allows the surface topography of a sample to be taken into account and simultaneously compensate for surface roughness. An example of such tracking is shown in detail in FIG. 6 of the application. Reference is made to the description therein.

It is particularly preferable for the confocal Raman microscope and/or fluorescence microscope to comprise a light source to excite light emission in the sample, as well as a detector to detect the photons emitted by the light emission, in particular the emitted Raman and/or fluorescence photons.

In addition to this device, the invention also makes available a device for imaging the surface of the sample by scanning a plurality of substantially punctiform regions of the surface, comprising an apparatus for confocally imaging the substantially punctiform region of the surface in a focal plane on a detector, wherein the device preferably has a surface topography sensor. In one embodiment, the surface topography sensor can be an independent apparatus. This is however not essential to the invention. Any type of sensor is suitable as the surface topography sensor by means of which it is possible to measure the surface topography, i.e., the deviation, e.g. of a sample surface, from the sample plane in the direction perpendicular to the sample surface, i.e. in the z direction. Such surface topography sensors can be both contact-free and non-contact free, i.e., tactile, surface topography sensors. Examples of tactile surface topography sensors are mechanical profilometers, AtomicForce microscopes (AFM microscope), for example, the AFM microscope alpha 300 A by WiTec GmbH or stylus instruments.

Examples of contact-free surface topographies are in particular optical sensors such as white light interferometers, triangulation sensors, laser scanning systems that for example use confocal microscopy, and confocal chromatic sensors. Also optical coherence tomography would be an alternative method.

When the surface topography sensor is an optical sensor, it has an independent beam path in a first embodiment next to the apparatus for confocally imaging the substantially punctiform region of the surface.

In a second embodiment of the invention, the excitation focus of the laser for the Raman measurement is guided through the same lens as the excitation focus of the surface topography sensor. In a preferred embodiment of the invention, the light of the confocal Raman and/or fluorescence microscope lies within a first wavelength range and the light of the confocal chromatic sensor lies in a second wavelength range, and it is particularly preferable when the first and second wavelength range do not overlap. When the wavelength ranges do not overlap, they are preferably selected so that the first wavelength range is defined by the limits of the emitted luminescence spectrum and/or Raman spectrum of the quantity to be investigated, and the second wavelength lies above or below the first wavelength range without overlapping the first wavelength range. For example, the first wavelength range for the emitted luminescence or Raman spectrum of the sample to be investigated can lie within a range of 500 nm to 1100 nm, and especially 532 nm to 650 nm. The second wavelength range extends from 350 nm to 500 nm, and preferably from 400 nm to 500 nm.

If a tactile device for determining the surface topography is combined with a confocal optical microscope such as a confocal Raman microscope, one tactile device suitable for being combined with the Raman microscope is the atomic force microscope (AFM).

In regard to AFM microscopy, reference is made to WO 02/48644 A1 that discloses such an AFM. With an AFM, the sample surface is scanned with the assistance of a scanning probe in the form of a tip.

The content disclosed in WO 02/48644 is completed included in the present application.

As described above, in confocal microscopy, the light from a monochromatic light source is guided on the path to the sample through a lens and is thereby substantially focused on a point of the sample surface. If the device is in particular a confocal Raman microscope, a spectrometer can break down the light spectrally that is emitted by the sample, i.e., the Raman or fluorescent light. Such a spectral breakdown can be done in a spectrometer, for example using a grating or a prism. If the light broken down in this manner is captured with a CCD camera, it is possible to capture the entire spectrum of the Raman or fluorescent light scattered by the sample. The advantage of spectrally breaking down the Raman light with a Raman microscope is that any spectral range can be selected to be measured by the detector for example by rotating the grid.

The device, especially the confocal microscope, preferably the confocal Raman and/or confocal fluorescence microscope, can have a movable sample table that makes it possible to image the sample surface for example by moving the sample. Alternately or in addition, the excitation light source for the detector can be moved to obtain an image of the sample. It is also possible to record spatial maps of spectral properties of the sample. A very high depth resolution is achieved, in particular with a confocal image. The movability of the sample table makes it possible to scan the sample or sample region.

As described above, the confocal chromatic sensor is generally also arranged in addition to the imaging device, i.e., with its own beam path.

The surface topography determined for example with the assistance of a confocal optical sensor is generally used in downstream or simultaneous Raman measurement to keep the sample surface continuously within the focal plane of the lens while sampling, e.g., within the plane for confocal Raman microscopy. The X-Y scan of the sample is expanded into an X-Y-Z scan, the Z scan serving to compensate for the sample topography.

The method and device as described before according to the first aspect of the invention enables a surface topography of a sample to be determined for confocal microscopy and the surface to be imaged to be brought into a confocal plane with the aid of the surface topography values. For this purpose, the device as described before has a surface topography sensor. The surface topography sensor can be a confocal sensor having an optical system, preferably having reflective and/or diffractive components. Alternatively, tactile sensors such as a profilometer, AFM, a white light interferometer, a triangulation sensor, or a laser scanning system are specified. The system described according to the first aspect of the invention has the disadvantage that first the surface topography of the entire sample is evaluated and a fluorescence or Raman measurement in consideration of the evaluated surface topography follows the determinations of the surface topography.

Alternatively thereto, the embodiments according to the first aspect of the invention describe performing a distance measurement with the aid of a surface topography sensor, in particular a chromatic sensor, determining a distance signal which is characteristic for the surface topography therefrom, and tracking the focal plane or confocal plane of the confocal microscope, in particular the confocal Raman microscope. This means that the sample is moved to bring it into focus. As long as the sample is not in focus, no Raman or fluorescence signal is detected. In the measurement of the surface topography using the chromatic optical sensor, light is solely sent to the surface, reflected there, and spectrally analyzed after reflection.

The regulation or control in the embodiments as described before is always a tracking of the focus for the Raman or fluorescence light, when the surface topography was evaluated from the radiation reflected back into the chromatic sensor. This means that the sample can be located for a relatively long time outside the focus for the Raman or fluorescence signal, so that for a long time, no Raman or fluorescence signal is detected, which has the result that the Raman or fluorescence signal is weak.

A further object of the invention is therefore to specify a method and a device, with which it is possible that a surface of a sample can be imaged in a confocal manner, i.e., with the aid of confocal microscopy faster than according to the first aspect of the invention. This presumes that the sample is always held in focus during the entire measurement, even with insufficiently flat sample topography, for example, a curved sample.

This second object is achieved according to the invention in that a method is provided for imaging a plane or a surface, in particular a surface having a topography, with the aid of confocal microscopy, in particular confocal Raman and/or fluorescence microscopy, wherein the device for carrying out the method comprises a first light source for generating excitation radiation for the Raman and/or fluorescence microscopy and a second light source for generating radiation in a wavelength range which does not coincide with the wavelength range of the first light source and/or the Raman or fluorescent light. Furthermore, the focal plane of the second light source is moved by means of a separately controllable focal position into/onto the surface of the sample and the topography of the sample which is thus ascertained or evaluated from the control signal of the controllable focal position is used to readjust the focal plane of the first light source.

The method according to the second object of the invention operates using two foci. The first focus is the focus of the Raman or fluorescence measurement, the second focus is the focus of the second light source, e.g., a laser light source. The focal plane of the second light source is brought by means of a separately controllable focal position onto the surface of the sample. The separately controllable focal position can be set, for example, by an electrically focusable lens. A periodic excitation of the lens, by which the focus thereof is periodically modified, is particularly preferred. Whenever the focus of the second light source comes to rest on the plane of the surface of the sample, a signal is detected. This is to be attributed to the fact that as a result of the confocal principle, light of sufficient intensity is reflected back to the detector only when the focus of the second light source comes to rest on the sample, so that a signal can be detected. The topography of the sample ascertained or evaluated from the control signal of the controllable focal position is used to bring the sample into the focal plane of the confocal Raman and/or fluorescence microscopy. Using the method according to the second aspect of the invention, it is possible, by way of the continuous analysis of the focal plane of the second light source, to keep the sample permanently in the confocal plane of the Raman and/or fluorescence measurement independently of the sample surface. In this way, the Raman and/or fluorescence signal is substantially strengthened in relation to that as is achieved using a regulation according to the device and method described in the first aspect of the invention, which merely represents tracking. Using the method according to the second aspect of the invention, it is possible to compensate for a technical and/or mechanical drift, so that longer measuring times are possible in relation to the method according to the first aspect of the invention, because thermal and/or mechanical drift is regulated out. The Raman and/or fluorescence measurement of liquids which vaporize, for example, is also possible, because the regulation according to the invention provides continuous tracking of the surface.

According to the second aspect of the invention, the specified readjustment is used to keep the sample in the focal plane for the Raman and/or fluorescence measurement.

The imaging of the plane surface, using confocal microscopy, in particular Raman and/or fluorescence microscopy, is achieved by scanning a plurality of regions of the plane surface, using an apparatus for confocal imaging of the region of the plane surface, in the plane of the first focus on a detector.

What is understood as the topography of a surface or a sample topography in the present application is to be described by way of example but not exhaustively for a confocal Raman microscope. Sample topography is understood in such an arrangement as simple irregularities greater than 1 nm, in particular greater than 10 nm, preferably greater than 100 nm. The simple irregularities are deviations of the sample surface in the z direction, which are also referred to as roughness.

The plane to be scanned is the x/y plane. The resolution in the x/y plane is, in a Raman microscope or fluorescence microscope, at least 0.1 µm, preferably at least 1 µm, preferably 1 µm to 50 µm. Most preferable is a resolution in the x/y plane at least of 0.61 $\lambda$/NA, wherein $\lambda$ is the wavelength of the Raman or fluorescence light and NA is the numerical aperture of the objective.

According to the second aspect of the invention, the focal plane of the second light source is continuously ascertained. For this purpose, the focal position of the second light source is varied, for example, with the aid of an electrically focusable lens, wherein the lens is preferably excited periodically, for example, at a frequency of 0.1 Hz to 1 MHz, especially 0.1 Hz to 1 kHz, preferably 200 Hz to 800 Hz. In addition to the lenses, the focus of which is electrically changed, it is also possible to periodically move the lens mechanically. An alternative frequency range to the indicated range of 0.1 Hz to 1 MHz, especially preferably 200 Hz to 800 Hz is a frequency range of 0.8 kHz to 1 MHz. The sample is moved to the focal plane of the first light source, which is ascertained or evaluated with the aid of the second light source and, for example, the lens which can be electrically focused, independent of the confocal plane of the confocal Raman or fluorescence microscopy. The movement of the confocal plane of the Raman/fluorescence microscopy takes place practically simultaneously with the measurement of the focal position of the second light source by using a closed loop feedback controller.

With the aid of the second light source, in particular the second laser light source, and the moving of the focus of the second light source with the aid of the electrically focusable lens, it is possible, for example, to keep the Raman microscope continuously on the surface of the sample or at a defined distance below or above it and therefore to operate confocal Raman microscopy even on a pronounced, i.e., nonplanar sample topography.

The travel of the focal position of the second light source is performed, for example, with the aid of an electrically focusable lens by applying a periodic changing electrical voltage. Alternatively to an electronically focusable lens, it would also be possible to vary the focus position of the lens by displacing the lens. For the ascertainment of the focal plane by variation of the focus of the second light source, it is necessary to adapt the modulation depth of the focus to the roughness or topography of the sample.

In one particularly preferred embodiment according to the second aspect of the invention, the readjustment of the focal plane of the first light source is performed by changing the distance between microscope objective lens and sample. This affects the offset of the modulated focus of the second light source and keeps this modulation near the surface.

In a further embodiment according to the second aspect of the invention, it can be provided that the light of the first and second light sources is guided through the microscope objective lens.

A particularly simple optical construction can be implemented if the control of the focal position of the second light source is essentially performed so that the focus of the second light source is displaced along the optical axis of the microscope.

A simple ascertainment of the topography of the sample is possible if the focal position of the second light source is periodically varied and the topography of the sample is determined by the time curve of the maxima of the intensity of the light, which is reflected or scattered on the surface of the sample, of the second light source.

It is advantageous if the focal position of the second light source is controlled by means of a focusable lens in the beam path proceeding from the second light source. An electrically focusable lens, in which the focal length is controlled by applying an electrical voltage or an electrical current, is a particularly simple embodiment, in which the focal position can be changed.

Alternatively thereto, it is possible to control the focal position of the second light source by means of a displaceable lens or lenses.

The required change of the distance between the microscope objective lens and the sample, which is determined by the controller/regulator, can be performed by moving the sample in the direction of the optical axis of the microscope. Alternatively, it is possible to move the microscope in the direction of the optical axis of the microscope or to move the microscope objective lens in the direction of the optical axis of the microscope.

It is particularly preferable if the wavelength range of the second light source does not overlap with the wavelength range to be detected by the Raman scattered light and/or the fluorescence light.

In addition to the method, the invention also provides a device for imaging the surface of a sample by scanning a plurality of regions of the surface in the x/y plane, comprising an apparatus for confocal imaging of the region of the surface in a focal plane on a detector, wherein the device has a first and a second light source.

In one embodiment of the second aspect of the invention, the excitation focus of the first light source for the Raman measurement is guided through the same objective lens as the excitation focus of the second light source for the control/regulation.

The light of the confocal Raman and/or fluorescence microscope lies according to the second aspect of the invention in a first wavelength range and the light of the second light source lies in a second wavelength range, wherein first and second wavelength ranges do not overlap. The first wavelength range is generally selected so that the first wavelength range is defined by the limits of the emitted luminescence spectrum and/or Raman spectrum of the sample to be studied and the second wavelength range is located above or below the first wavelength range without overlap with the first wavelength range. For example, the first wavelength range for the emitted luminescence or Raman spectrum of the sample to be studied can extend in the range from 350 nm to 1000 nm, preferably 500 nm to 1000 nm, in particular 532 nm to 650 nm. The second wavelength range extends e.g. from 1000 nm to 2000 nm, preferably 1000 nm to 1500 nm. In case the first wavelength region extends only between 532 nm to 650 nm, the second wavelength region can start at 650 nm providing for low chromatic aberrations As described above, in confocal microscopy, the light of the monochromatic first light source is conducted through an objective lens on the path to the sample and thus focused substantially on one point of the sample surface.

In the case in which the device is a confocal Raman microscope in particular, it can be provided that a spectrometer spectrally decomposes the light which is emitted from the sample, i.e., the Raman or fluorescence light. Such a spectral decomposition can be performed in the spectrometer, for example, using a grating or a prism. If the light thus decomposed is recorded using a CCD camera, it is thus possible to record a complete spectrum of the Raman or fluorescence light scattered by the sample. The advantage of the spectral decomposition of the Raman light in a Raman microscope is that, for example, by rotating the grating in the spectrometer, an arbitrary spectral range can be selected for the detector for measurement. The device, in particular the confocal microscope, preferably the confocal Raman and/or confocal fluorescence microscope, can have a movable sample table, which enables the sample surface to be imaged by moving the sample, for example. Alternatively or additionally, the objective lens or the microscope itself can also be moved to obtain an image of the sample. It is also possible to record spatial maps of spectral properties of the sample. A very high depth resolution is achieved in particular using confocal imaging. The mobility of the sample table in the x/y direction enables scanning of the sample or a sample region.

With the aid of the second light source and in particular in combination with the electrically focusable lens, according to the invention, the focal plane of the second light source can be brought by means of separately controllable focal position into/onto the surface of the sample. The topography of the sample for readjusting the focal plane of the first light source for the Raman microscopy is ascertained from the control signal of the controllable focal position. This control/regulation enables the sample surface to be kept continuously in the confocal plane for the confocal Raman microscopy during scanning. For this purpose, the X-Y scan of the sample is expanded to an X-Y-Z scan, wherein the Z scan is used to compensate for the sample topography. In contrast to the first aspect of the invention, it is not necessary for the control/regulation in the method according to the invention to firstly record the surface topography, in order to then track the sample plane in the focus, rather the continuous determination of the focal position with the aid of the second light source enables the simultaneous bringing of the sample into the focal plane of the objective lens for the confocal Raman and/or fluorescence microscopy.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIGS. 8a-8d show a sample and a measurement using a device according to FIG. 1b.

FIG. 9b shows the schematic structure of a Raman microscope having first and second light source, according to the second aspect of the invention wherein the excitation focus of the first light source for the Raman measurement is guided through the same objective lens as the focus of the second light source.

FIG. 11 shows the topography of a sample to be studied.

FIG. 14 shows the intensity curve of the Raman signal with and without regulation and also surface topography of the sample.

DETAILED DESCRIPTION

Although the present invention will be described below with reference to exemplary embodiments of a device for imaging a sample surface, especially by means of scattered Raman light, a so-called confocal Raman microscope, the invention is not limited thereto. Rather, it comprises all confocal microscopes, in particular also confocal light microscopes or fluorescent microscopes. A chromatic sensor can also be used for such a confocal microscope to track the confocal plane when the surface topography of the sample to be investigated is pronounced.

Figure 1A:
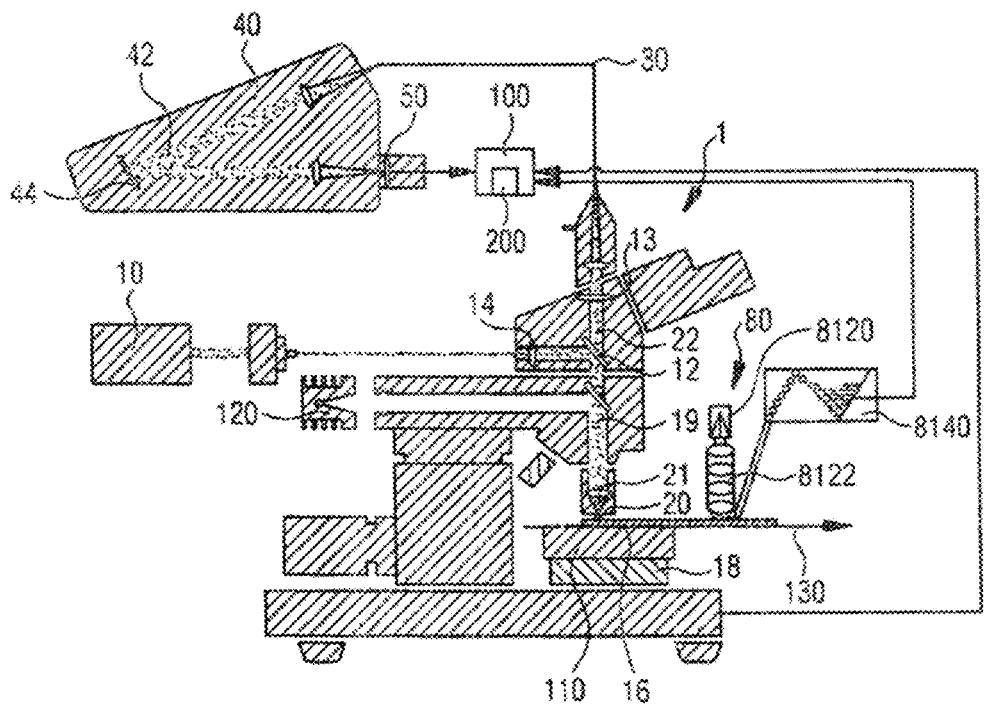
FIG. 1a shows a basic design of a Raman microscope having a surface topography sensor, in particular an optical surface topography sensor, where the beam path of the surface topography sensor is different from the beam path of the Raman microscope.

FIG. 1a shows the basic design of a first embodiment of a confocal Raman microscope for recording a sample surface. With the assistance of confocal Raman microscopy, chemical properties and phases of liquid and solid components can be analyzed down to the range of resolution limited by diffraction of approximately 200 nm. It is unnecessary to mark the sample, for example using fluorescent substances as in fluorescence microscopy. By means of the confocal design, depth resolution is provided that makes it possible to analyze the depth of the sample without for example having to create sections.

With confocal microscopy, a punctiform light source, preferably a laser, is imaged on a point of the sample. Then this pixel is preferably focused preferably using the same lens on a pinhole in front of a detector. The size of the pinhole needs to be adapted to the image of the light pattern limited by diffraction. The image is generated by scanning a point from the illumination source over the sample; the sample is accordingly scanned point for point. The image contrast is significantly increased with this type of imaging since only the focal plane of the lens contributes to the imaging. In addition, the resolution can be reduced with the aperture of the pinhole to approximately $\lambda/3$ by approximately a factor of $\sqrt{2}$ due to the convolution of the refraction point. In addition, a three-dimensional image of the sample structure can be obtained with an axial resolution of approximately one wavelength.

In regard to confocal microscopy, reference is for example made to DE 199 02 234 A1.

FIG. 1a shows a possible design of a confocal Raman microscope, for example the microscope alpha300 R by Witec GmbH, 0-89081 Ulm, in Germany. With the confocal Raman microscope 1, the light from a light source 10 is directed after beam expansion 14 by a beam splitter mirror 12 toward the sample 16 on the sample table 18. The deflected light beam 19 is focused by a suitable lens 21 on a substantially punctiform region 20 on the sample 16. The light from the laser interacts with the material of the sample 16. Reflected Rayleigh light arises from the sample at the same wavelength as the incident light. This line is deflected by a beam splitter 12 to a cut-off filter or notch filter 13 and does not reach the detection lens.

The light that has (a) different frequency/frequencies than the Rayleigh light emitted from the sample, that is, the Raman light, passes through the beam splitter 12. After the beam splitter 12, the Raman light is identified with reference number 22. By means of a pinhole (not shown), the Raman light 22 is coupled into a light conducting fiber 30 and reaches a spectrometer 40. In the spectrometer 40, the beam of Raman light is further expanded with a suitable lens to produce the beam 42 that contacts a grating spectral filter 44. The grating spectral filter 44 bends the light in different directions corresponding to its wavelength so that a spectral signal can be recorded on the CCD chip 50 depending on the location. The CCD chip 50 has for example 1024 channels which allow the 1024 channels of the CCD chip to record light at different wavelengths.

The image of the sample arises by scanning in the x-/y plane in the direction of the arrow 130.

For adjustment or observation, light from a white light source 120 can also be directed toward the sample 16.

The confocal Raman microscope 1 also comprises a confocal chromatic sensor 80. The confocal chromatic sensor 80 is designed in addition to the confocal Raman microscope 1. In the portrayed embodiment according to FIG. 1a, the confocal chromatic sensor comprises its own beam path independent from the Raman microscope 1. Consequently, the confocal chromatic sensor 80 has its own white light source 8120, a refractive optical element 8122, an optical arrangement for recording the light reflected from the sample, and a light-sensitive sensor unit that can recognize and evaluate the associated spectral color such as a spectrometer.

The light from the white light source 8120 passes through the lens system with a high chromatic error of the refractive optical element. The incident white light is imaged in different focal planes depending on the wavelength. The light imaged in different focal planes is reflected by the sample 16, e.g. recorded by the lens, and then fed to the spectrometer 8140 as a sensor component. With the assistance of the spectrometer 8140, the signal can be evaluated, and the distance from the refractive optical element 8122 of the confocal chromatic sensor 80 to the surface of the sample 16 can be determined from this signal, and hence the surface topography can be determined.

The fact is exploited that the wavelength of the focal plane in which the sample surface is located manifests a maximum intensity in a spectrometer. By determining the intensities, each wavelength in the spectrometer 8140 can be assigned a sample distance, that is, the distance from the sample 16 to the refractive optical element 8122. With the assistance of the confocal chromatics sensor 80, it is hence possible to determine the topography of the sample perpendicular to the sample plane, that is, in the z direction, quickly and directly in a purely optical manner, that is, without time-consuming scanning.

The confocal chromatic sensor 80 therefore enables the sample surface topography to be optically determined.

Figure 1B:
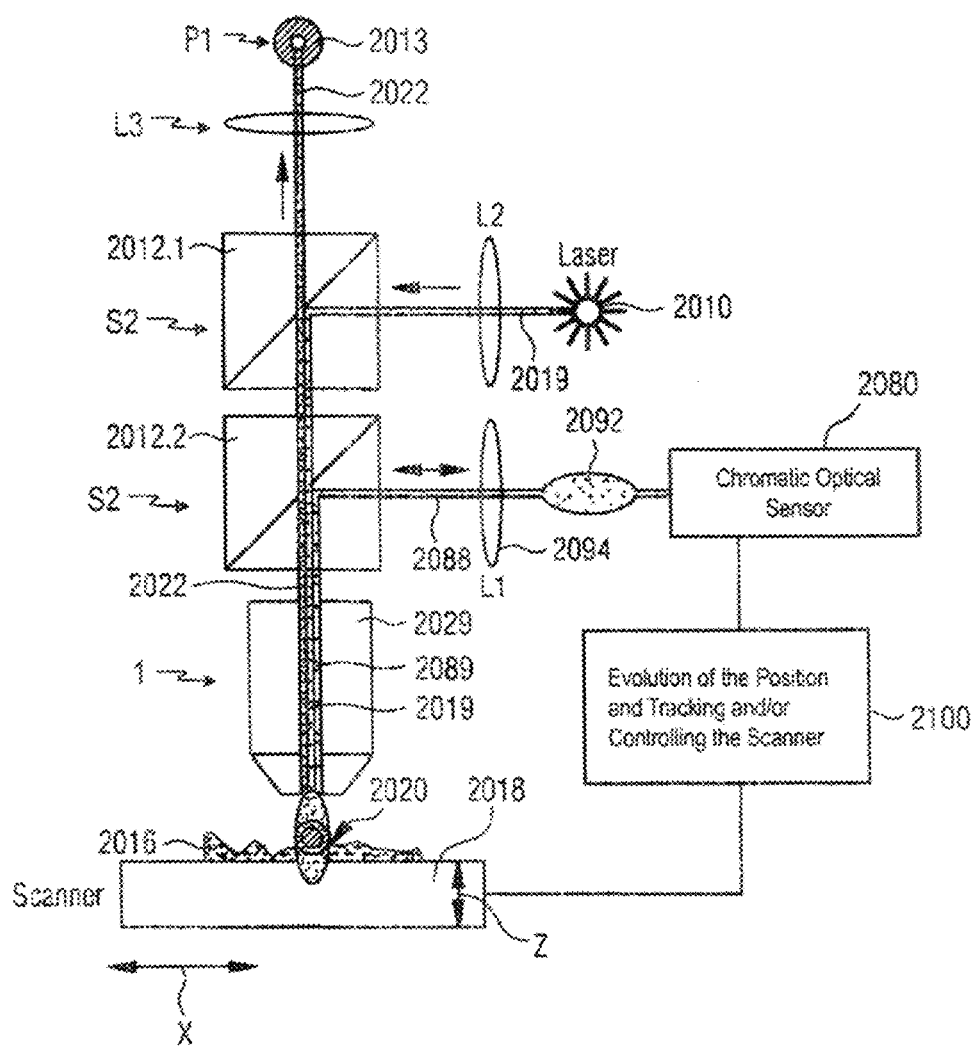
FIG. 1b shows a basic design of a Raman microscope having an optical surface topography sensor, the excitation focus of the laser for Raman measurement being guided through the same lens as the excitation focus of the optical surface topography sensor.

Although the chromatic sensor has its own beam path in the present exemplary embodiment in FIG. 1, this is not essential. In an alternative embodiment according to FIG. 1b, the beam path of the confocal chromatic sensor can also be integrated in that of the confocal microscope, for example, the confocal Raman microscope.

FIG. 1b shows the basic design of a confocal Raman microscope where the excitation beam of the light source, or the laser for Raman measurement, is guided parallel to the excitation beam for measuring topography according to a second exemplary embodiment of the invention. The same components in FIG. 1a above are identified with reference numbers increased by 2000. With the Raman microscope 01 shown in FIG. 1b, both the light from the light source 2010 for exciting the Raman light as well as the light of the confocal chromatic sensor 2080 is focused by the same lens 2029 on substantially the same region 2020 of the sample 16. The focus position for Raman measurement, i.e., the confocal focus of excitation laser light from the light source 2010 for exciting the Raman effect can be selected within the measuring range of the confocal chromatic sensor. The light from the light source 2010 is fed by means of a beam splitter 2012.1 in the direction of the sample 2016. The light beam 2019 is deflected in the beam splitter 2012.1 toward the sample 2016 and passes through another beam splitter 2012.2. The Raman light generated by the sample from interaction passes through beam divider 2012.1 and beam divider 2012.2 and, following divider 2012.2, is identified as 2022. Following beam divider 2012.2, the light beam 2022 is focused on a pinhole 2013 before a detector (not shown). The detector can detect reflected and/or scattered and/or emitted light from the surface. The ellipsoid 2092 that is shown in the light path between the chromatic sensor 2080 and the lens 2094 indicates the spatial distribution of the focal planes of the chromatic sensor 2080. This is imaged by the lens 2094 and the lens 2029 on the sample 2016. The ellipsoid is compressed by reducing this lens system consisting of lens 2094 and lens 2029. In the detector, the Raman light is for example detected broken up spectrally. In addition to the light from the light source 2010 that serves to excite the Raman effect in the sample, the light from the light source (not shown) of the confocal chromatic sensor 2080 is sent by the other beam divider 2012.2 through the same lens 2029 as the light for exciting the Raman on the sample 2016. The light beam is designated as 2019. The white light from the light source of the confocal chromatic sensor that is directed toward the sample is designated as 2088. The white light radiating toward the sample is imaged in different focal planes depending on the wavelength and is reflected by the sample. The reflected light 2089 is deflected by the other beam divider 12.2 to the confocal chromatic sensor 2080 and evaluated to determine the surface topography.

Since both of the light to excite the Raman effect as well as the confocal chromatic sensor can pass through the same lens, it is advantageous when either different spectral ranges or a time-division multiplex device is used. For example, the light of the chromatic optical sensor can lie within a wavelength range of 400 nm to 500 nm, and the light wavelength for exciting the Raman effect can be 532 nm. Such an arrangement would allow Raman spectra generally above 532 nm to be detected. Of course, it would also be conceivable to choose other wavelengths. As an alternative to two different wavelength ranges, the measurements can also alternate sequentially over time and be evaluated in a time-division multiplex device.

The design shown in FIG. 1b enables the topography of a sample surface to be tracked with the assistance of the confocal chromatic sensor 2080, wherein the excitation focus of the later for Raman measurement is guided parallel to the topography. The focus position of the laser on the sample can be adjusted anywhere within the reception range of the chromatic sensor 2080. The scanner or stepping motor of the motorized stage can be tracked by means of a controller or an actuator. In the second case, the chromatic optical sensor 2080 can be calibrated for the high resolution lens 2029.

In addition to Raman measurement, pure topographic measurement is possible using a high-resolution lens 2029.

At the same time, the topographic resolution improves.

Such contact-free topographic measurement is particularly suitable for samples with a topography that is too high for AFM (>5 µm), or with lateral structures that are much larger than the typical scanning ranges of piezo scanners (100 µm).

Figure 1C:
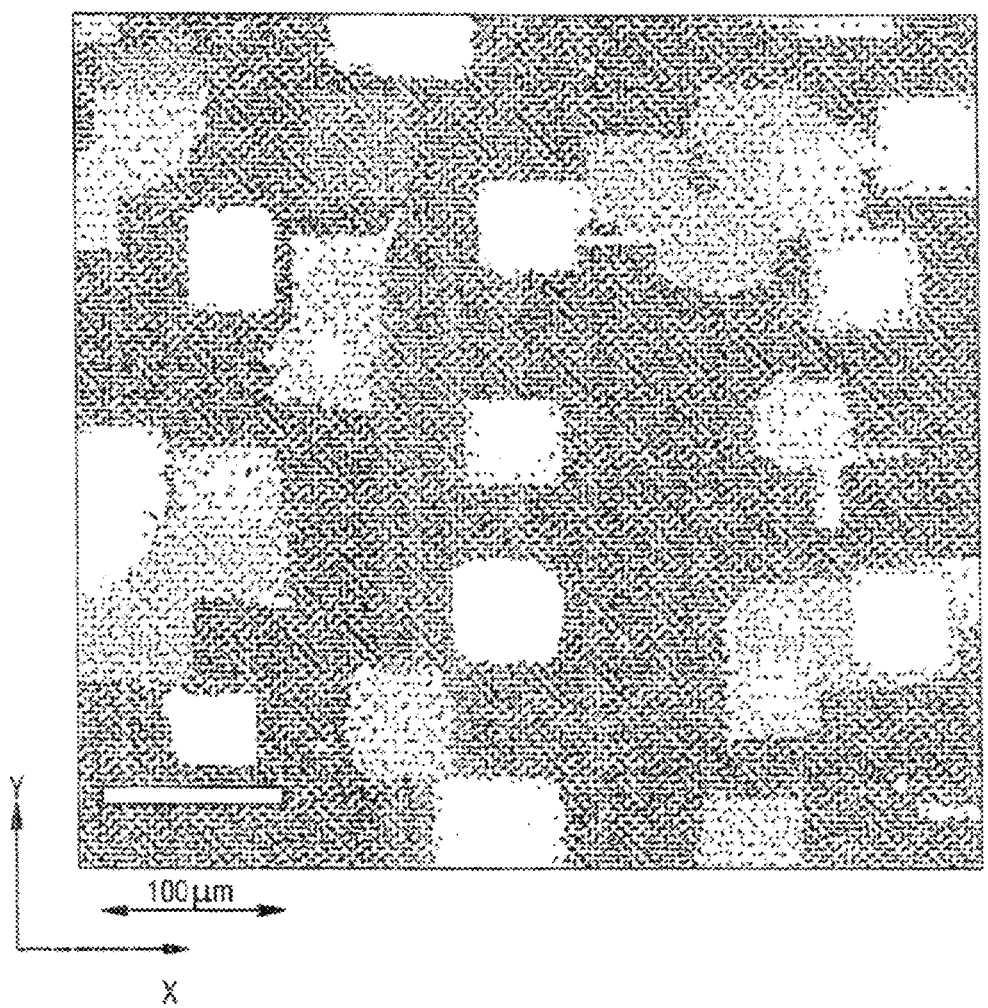
FIG. 1c shows a topographic measurement of a sample using the device according to FIG. 1b.

FIG. 1c shows a topographic image that was recorded using a chromatic optical sensor through a high-resolution lens (50×/NA=0.8). The scanning range is 500 µm×500 µm, and the color scale (black to white) extends from 0-5 µm. In this image, the scanning table was controlled in the z direction, that is, perpendicular to the sample surface, with the assistance of the position signal of the chromatic optical sensor 2080. With such a control, the excitation laser is always held at the same distance from the sample surface during simultaneous Raman measurement.

The lateral shift, that is, the shift of the sample table in the x and y direction, was executed by stepping motors of the motorized stage and/or piezo stage.

The detected light of the topographic or Raman measurement according to FIGS. 1a and 1b is transmitted with the assistance of e.g. a CCD chip 50 to an evaluation unit 2100. The evaluation unit 100, 2100 is part of the controls for the sample table 18, 2018. The precise positions in the x, y and z directions of the sample table 18, 2018 are detected by the evaluation unit 100, 2100. In general, the sample 16, 2016 is scanned by moving the sample table designed as a shuttle table and/or a motorized stage 110, 2110. The shuttle table can be designed as a piezo table. The shuttle table 110 with the samples arranged thereupon can be shifted in the x, y and z direction by means of piezo elements.

The surface topography or the image of the sample is determined by scanning in the x-y plane. The light source or the optical fiber and/or the sample can be moved. Once the surface topography is first determined, the values for the surface topography are recorded, assigned to the respective, substantially punctiform regions, and saved. After the entire sample has been scanned and the values have been determined for the surface topography, the sample is moved at least to a part of the substantially punctiform areas for which the surface topography values were determined in order to perform Raman and/or fluorescence measurements at these points taking into account the surface topography. This process is hence a so-called two pass process, i.e., the topography and Raman measurements are sequential. With this device, small modulations along the topography can also be performed to take into account the roughness of the sample.

Figure 2:
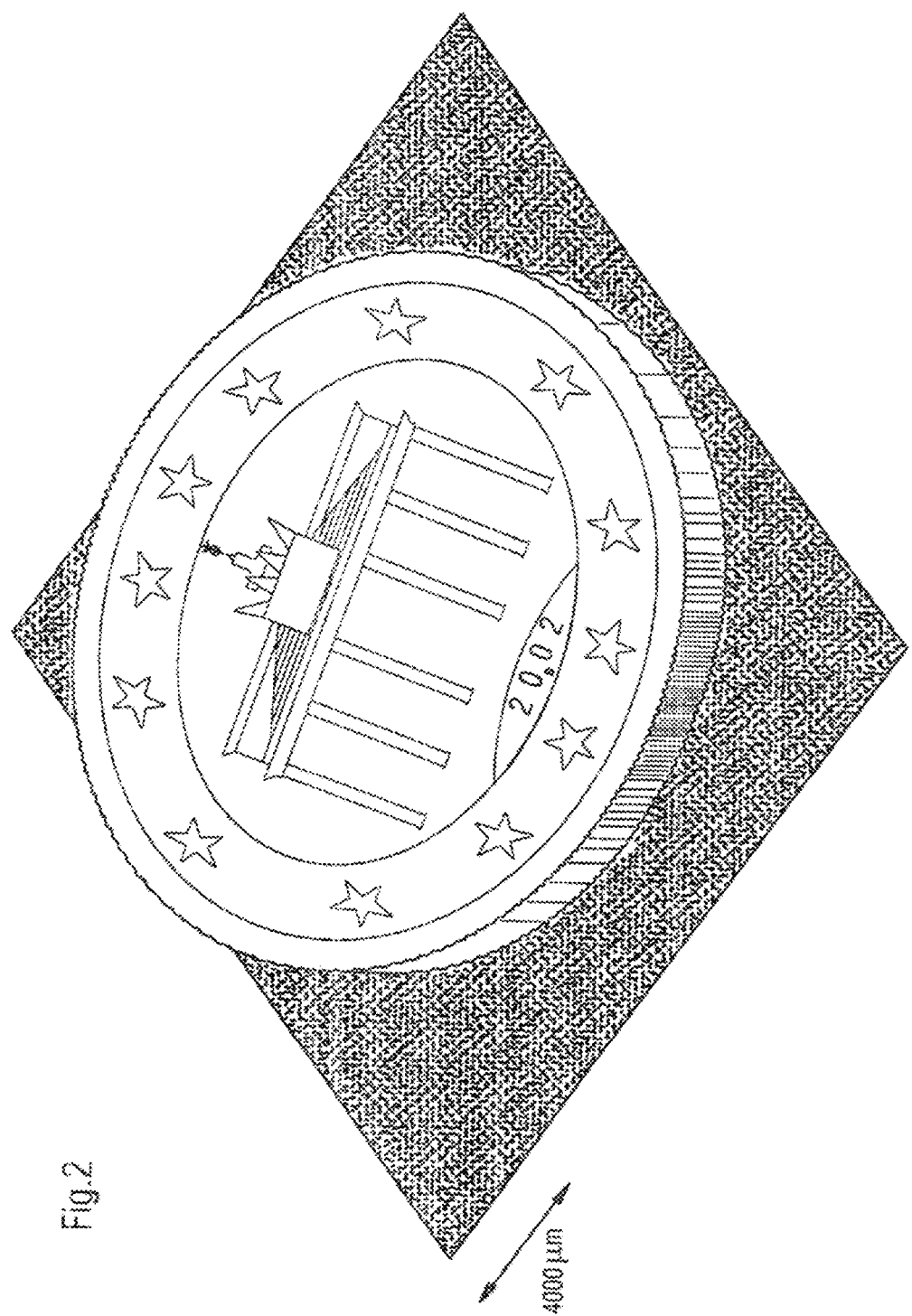
FIG. 2 shows a topography of a coin measured using a device with a confocal chromatic sensor.
Figure 3:
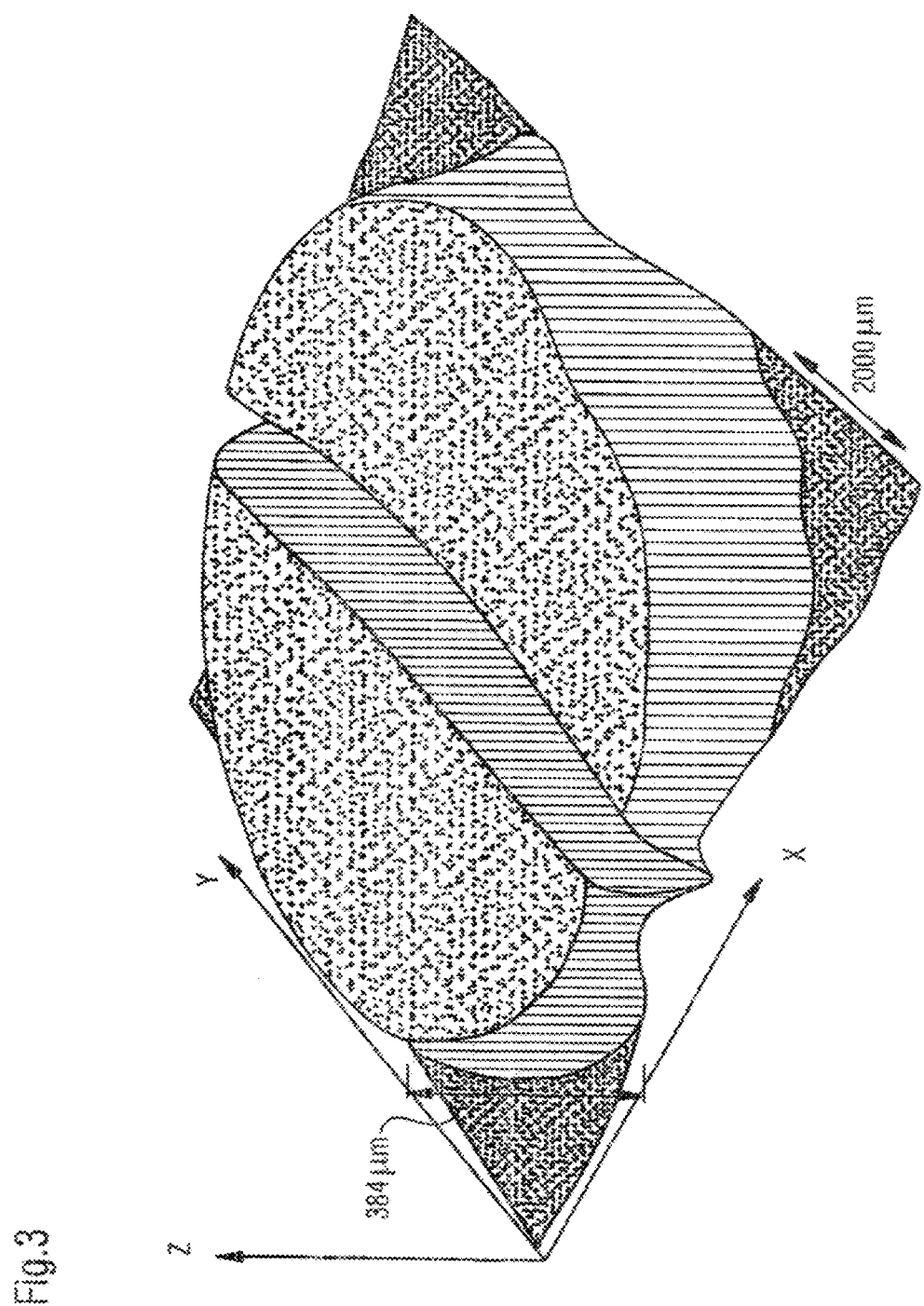
FIG. 3 shows a topographic image of a tablet superimposed with information from Raman microscopy.

If e.g. Raman data are also collected in addition to the topography, i.e., the topography signal is used to control the focal plane for the Raman signal, the process is a one-step process. FIGS. 2 and 3 which follow show the difference between a pure topographic image (FIG. 2) and an image obtained in a single-step method that shows the surface topography with additional Raman information (FIG. 3).

FIG. 2 shows the topography of a 10 cent coin measured using a confocal chromatic sensor (reference number 80 FIG. 1). The x-y plane is also indicated in which the scan was performed.

The topography extends in the z direction. By means of the chromatic sensor 80, 2080 according to FIGS. 1a and 1b with which white light is directed through the refractive optical element to the sample in the x-y plane, light of different wavelengths is imaged in different focal planes due to the large chromatic error of the refractive lens system of the chromatic sensor 80, 2080. If light reflected by the sample 16 is spectrally analyzed, for example in a spectrometer, information about the distance between the sensor and sample surface can be inferred from the intensity distribution. The wavelength with a focal plane in which the sample surface is located manifests a maximum intensity in the spectrum. When the sample is scanned in the x-y direction, the wavelength at which the maximum intensity is manifested can be determined for each largely punctiform region of the sample. The distance between the chromatic sensor and the surface, and hence the surface topography, can be inferred from the wavelength on the basis of the chromatic error.

The topographic image is then obtained by scanning in the x-y direction. If it is found e.g. at one point that the wavelength at which maximum intensity occurs is 500 nm, and it is e.g. 550 nm at another location on the sample, the one region is e.g. increased with reference to the other reason.

The image shown in FIG. 2 is such a purely topographic image of the sample surface, that is, FIG. 2 only portrays the surface topography using a chromatic sensor without any information on the substances of the surface that for example can be determined by means of Raman or fluorescence measurements.

In contrast, FIG. 3 shows a picture of a surface where Raman data was recorded with a confocal Raman microscope in addition to the surface topography that was determined by means of the chromatic sensor. Both the x/y direction and z direction are indicated.

Measurements are taken every 12 μm in the x/y direction.

The investigated surface is the surface of a tablet. The distribution of the active ingredient in the tablet itself was determined by means of Raman spectra.

With the assistance of the topographic image, the sample surface is held continually within the focal plane of a Raman lens simultaneous to the Raman measurements. This yields FIG. 3.

With the image according to FIG. 3, the information obtained about the active ingredient distribution with the Raman spectra are added to the topographic image.

FIG. 3 shows a picture in which, for the first time, the distribution of an active ingredient could be determined in a sample that is not flat.

Figure 4:
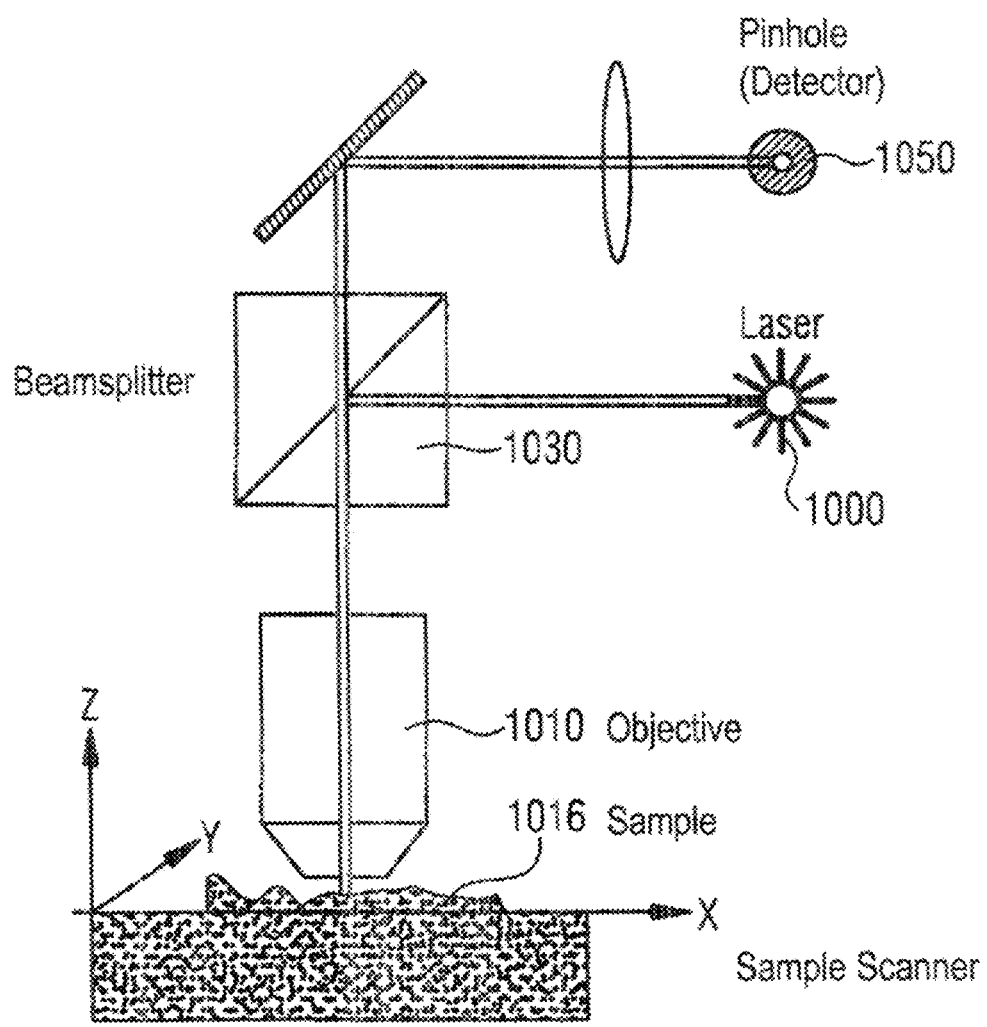
FIG. 4 is an optical beam path for extended focus measurement and automatic focus tracking.

Instead of determining the surface topography by means of chromatic sensors, it is also possible to periodically move the sample in the z direction. The sample is therefore moved through the focus in the z direction. If the surface topography is for example only generated by the roughness of the sample, at least an average of the Raman spectra in an averaged x/y plane can be obtained by moving the sample, thereby yielding a sharp image of the sample surface with relatively even intensity. FIG. 4 shows the optical beam path of a system in which the sample is moved periodically in the z direction.

The excitation light is provided by a light source 1000 and directed by the lens 1010 to the sample surface 1016. The light generated by this excitation, i.e., the reflected, emitted or scattered light, is directed by the beam splitter 1030 to the detector 1050 such as a CCD camera. The generation of Raman light is a scattering process.

While the sample is being moved to different locations in the x/y direction and the image of the sample is being generated by scanning in the x/y direction, the sample is also periodically moved in the z direction. When the sample is periodically moved in the z direction, the sample is continuously moved through the confocal focus plane. Sample roughness can be averaged therefrom.

Figure 5A:
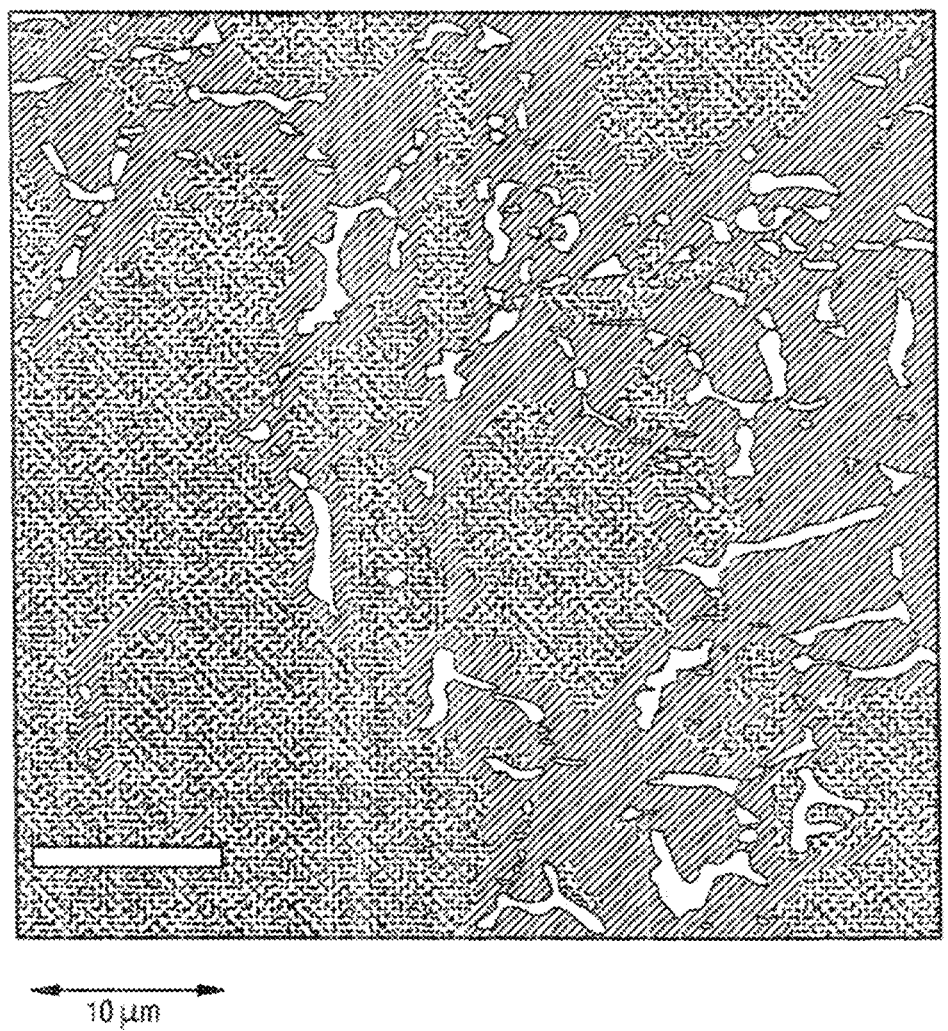
FIGS. 5a-5b are pictures of a rough silicon surface as a confocal Raman image (FIG. 5a), and as a confocal Raman image where the sample or lens is periodically moved in the z direction (FIG. 5b).
Figure 5B:
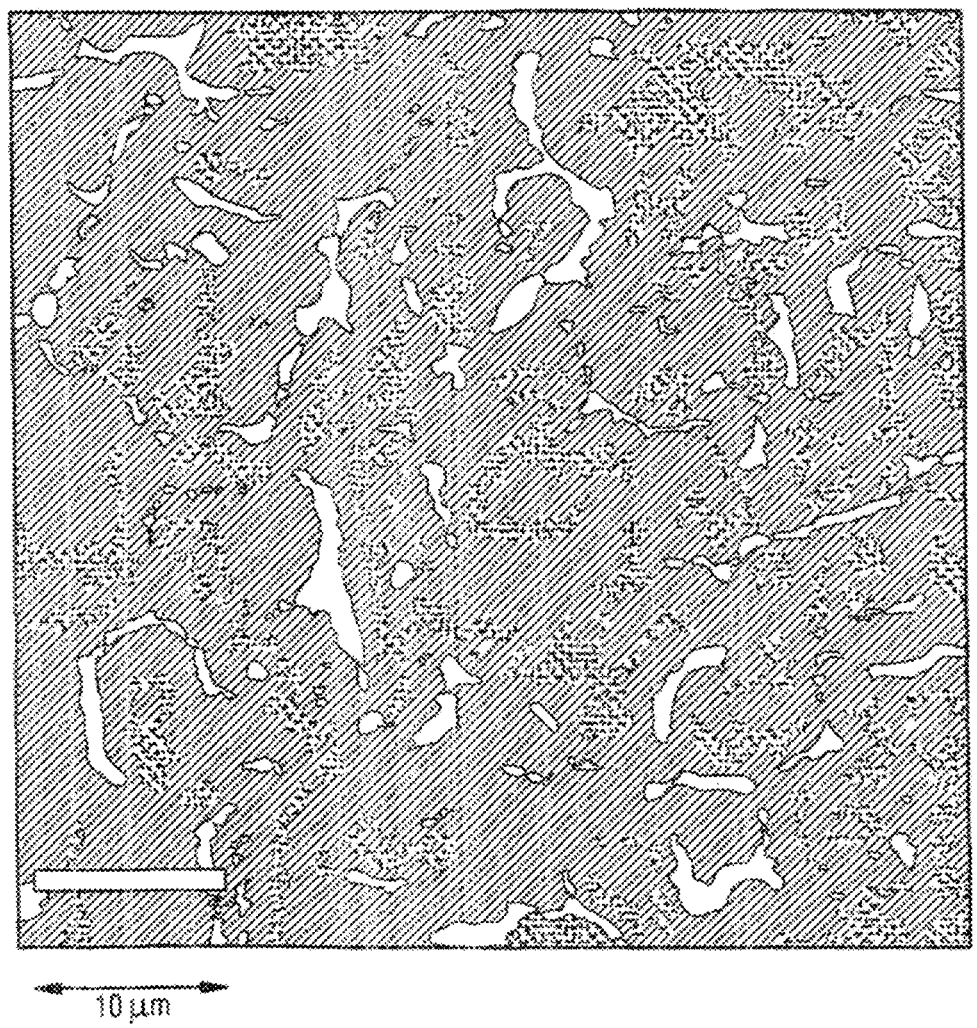

As can be seen in FIG. 5a to 5b, a signal for confocal Raman measurement can be obtained by moving in the z direction, even when the surface is rough. This will be explained below.

FIG. 5a shows confocal Raman measurement without modulation in the z direction.

Since many regions in FIG. 5a do not lie in the focus due to the roughness of the sample, many regions of the image are dark, that is, without a signal.

When modulation is incorporated, that is, movement in the z direction, the dark regions disappear and, as shown in FIG. 5b, a consistently sharp image is obtained with even intensity.

If the modulation amplitude is large enough, i.e., greater than the highest sample topography, the topography can be determined by locating the position of the maximum Raman and/or Raleigh intensity in each modulation period. In such an instance, a confocal chromatic sensor is unnecessary. This method is an alternative method for determining or compensating the topography. The advantage is that it is a single-past process, i.e. the Raman measurement and topography measurement are simultaneous. At large amplitudes, the focus only lies within the area of the sample surface for a small part of the modulation amplitude which can lead to inefficient exploitation of the Raman measuring time.

To optimally exploit the measuring time, smaller modulation amplitudes can be used. In such a case, a control system ensures that the modulation always occurs at the last found topographic value, i.e., the modulation in the z direction is used for the automatic confocal tracking of the focus. A signal characteristic for such tracking is shown in FIG. 6.

Figure 6:
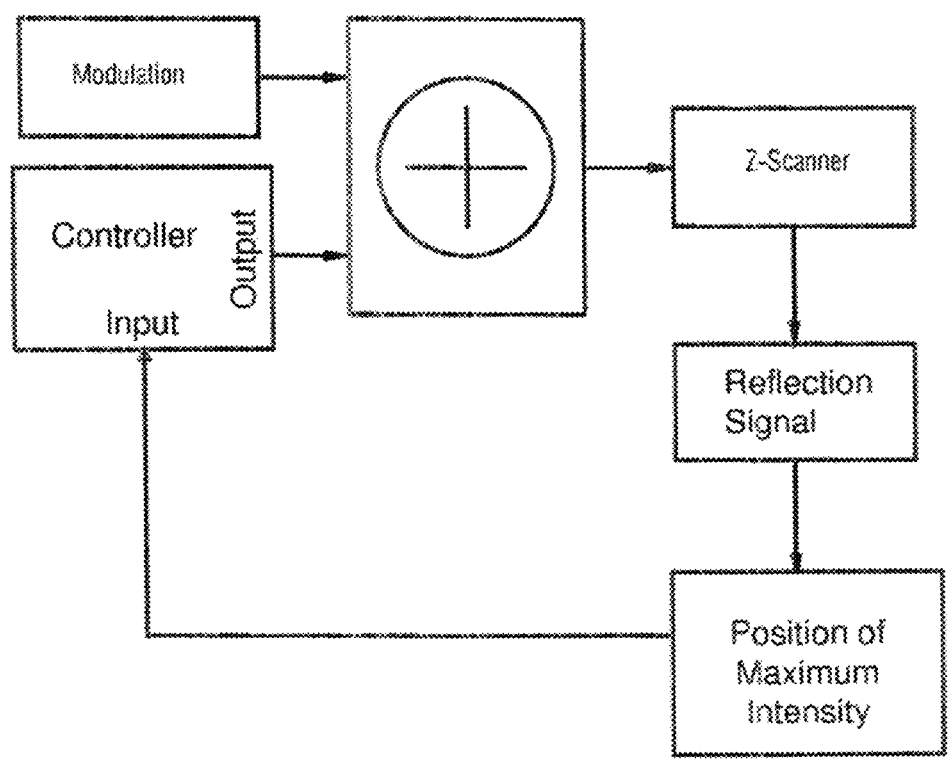
FIG. 6 is a diagram of a control loop for automatic focus tracking.
Figure 7A:
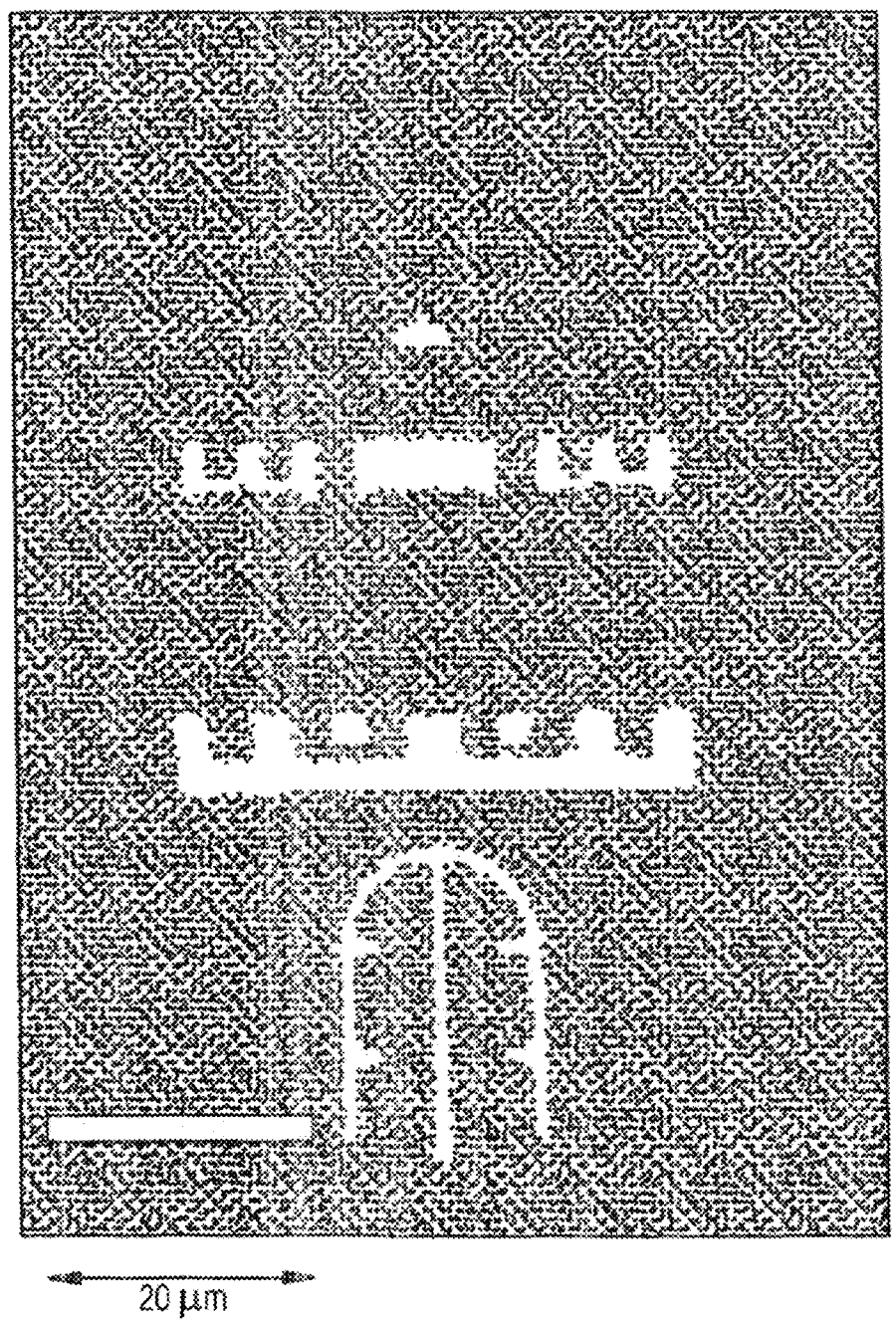
FIGS. 7a-7b show a measurement with confocal automatic focus tracking as an optical image and topographic image.
Figure 7B:
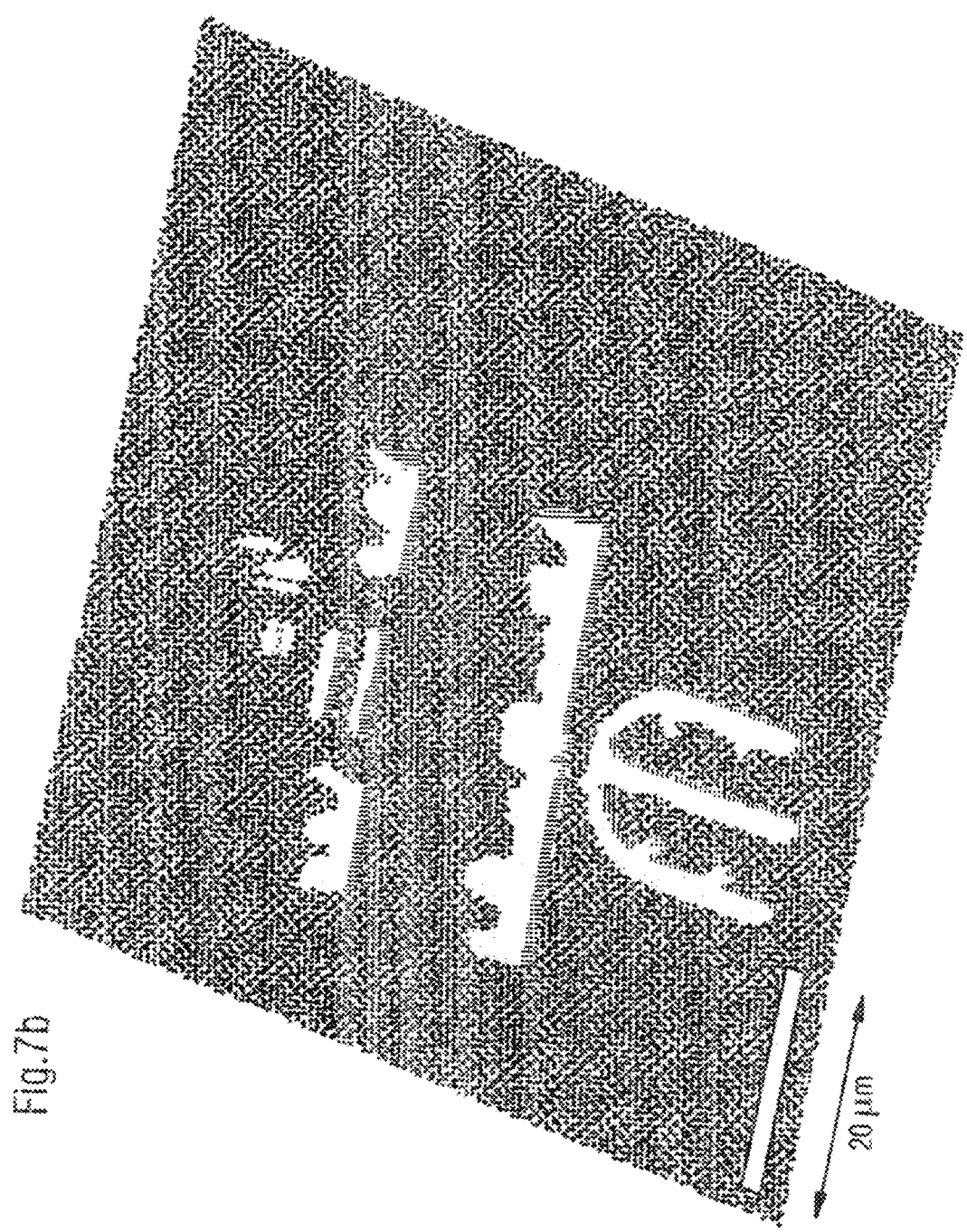

As seen in FIG. 6, the sample is modulated in the z direction, and the signal characteristic of the reflection is detected. The position of maximum intensity is determined from the reflection signal characteristic, and the position of maximum intensity corresponds to the optimum focus on the surface. If the position of maximum intensity is sent to a controller, the center of the modulation can be tracked, i.e., adapted to the surface topography of the sample. Measurement using such automatic confocal focus tracking is shown in FIGS. 7a and 7b. FIG. 7a shows the reflected light, and FIG. 7b shows the surface topography of the sample determined from tracking the focus. In a preferred embodiment concurrently with the determination of the surface topography the Raman or fluorescence measurement is performed.

Figure 8A:
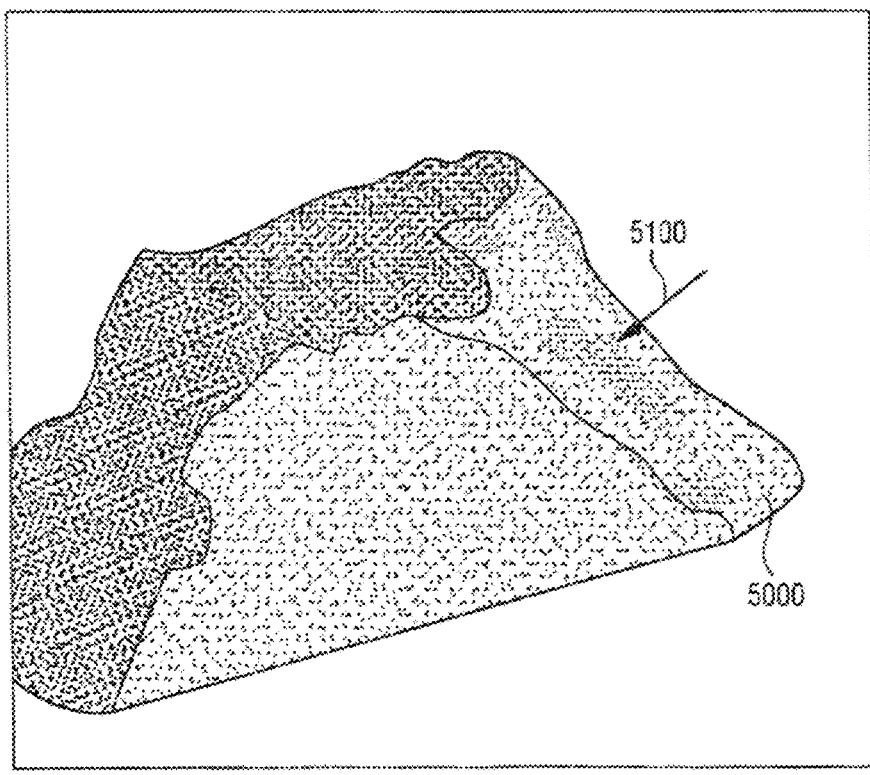

FIG. 8a to 8d show an object to be investigated, in this case the rock 5000 shown in FIG. 8a, the surface of which was investigated with the assistance of a device according to FIG. 1b.

Figure 8B:
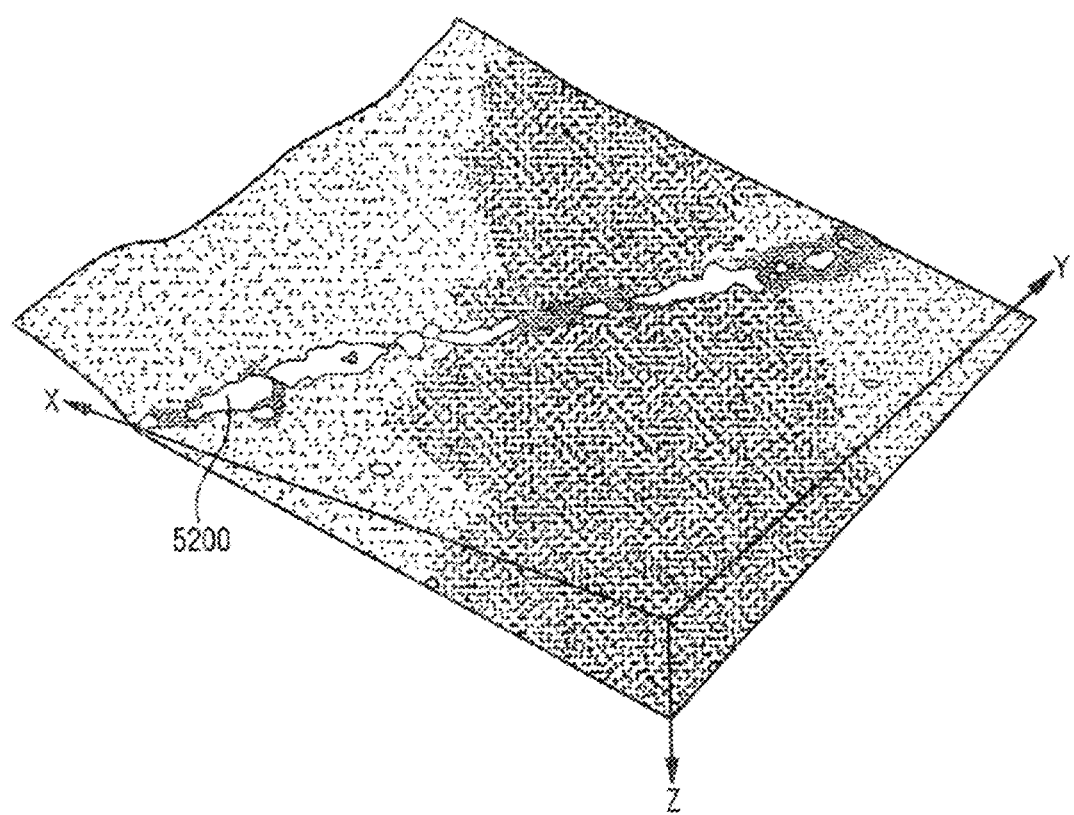

FIG. 8b shows a Raman measurement of the surface identified as 5100 in FIG. 8a. When the topography of the sample surface 5100 of the body from FIG. 8a is not taken into consideration, a Raman signal 5200 can only be obtained within the range of the focal plane of the Raman microscope.

Figure 8C:
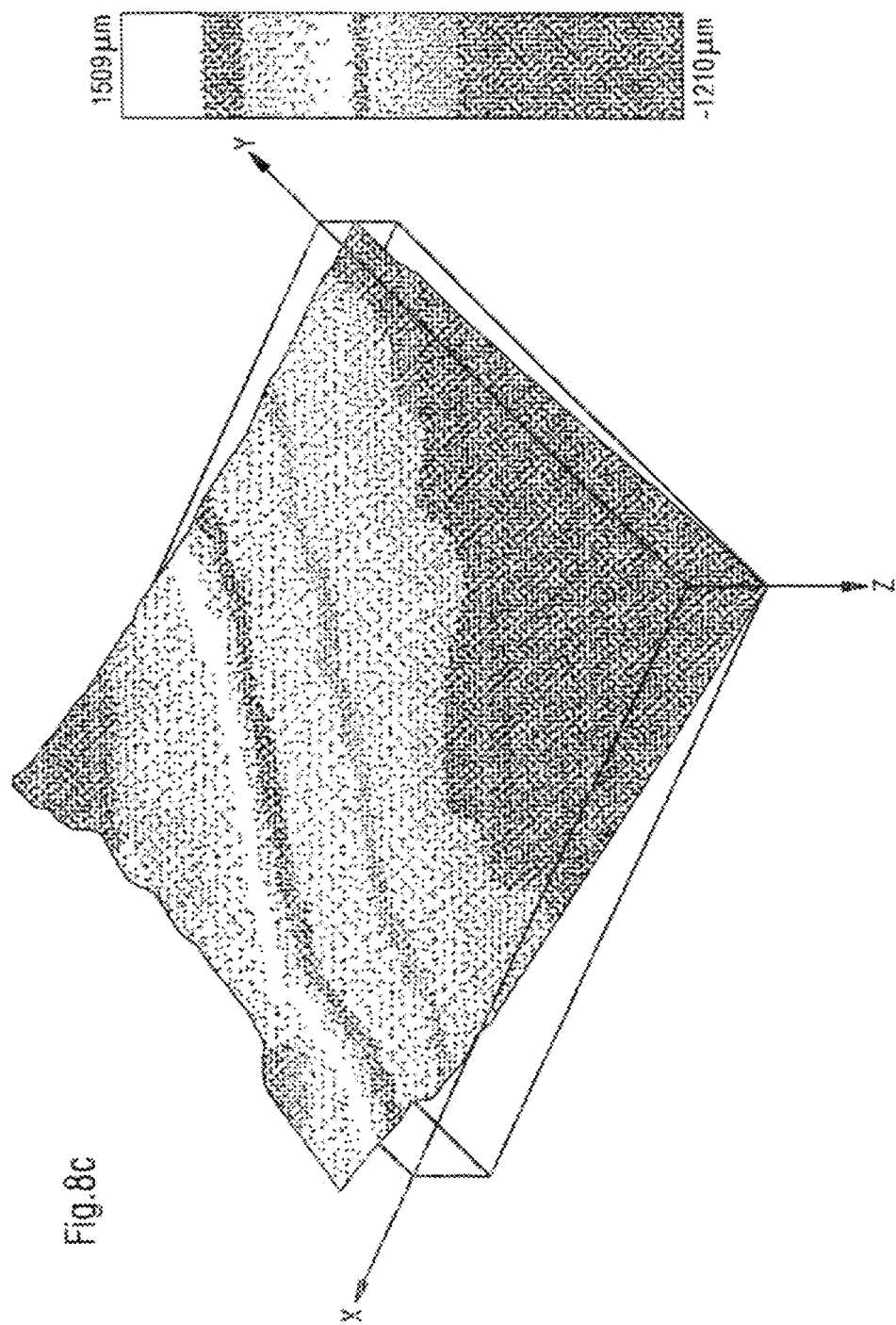

If the topography or the contour lines of these sample surface is detected with the assistance of the confocal chromatic sensor, the topographic image results which is shown in FIG. 8c.

If the topography obtained in FIG. 8c using the device according to FIG. 1b is used to track the focus for Raman measurement, the surface results that is shown in FIG. 8d. Different Raman signals result for different materials for the various regions of the surface 5100. The regions of different materials that result when the topography from FIG. 8c is taken into account are for example identified with reference numbers 5300.1, 5300.2.

By tracking the topography, the entire surface of the object from FIG. 8 can therefore be investigated a spectroscopically. If the topographic measurement is not included in the Raman measurement, a Raman measurement only results for the region in which the focus of the Raman microscope lies, as shown in FIG. 8b.

Figure 9A:
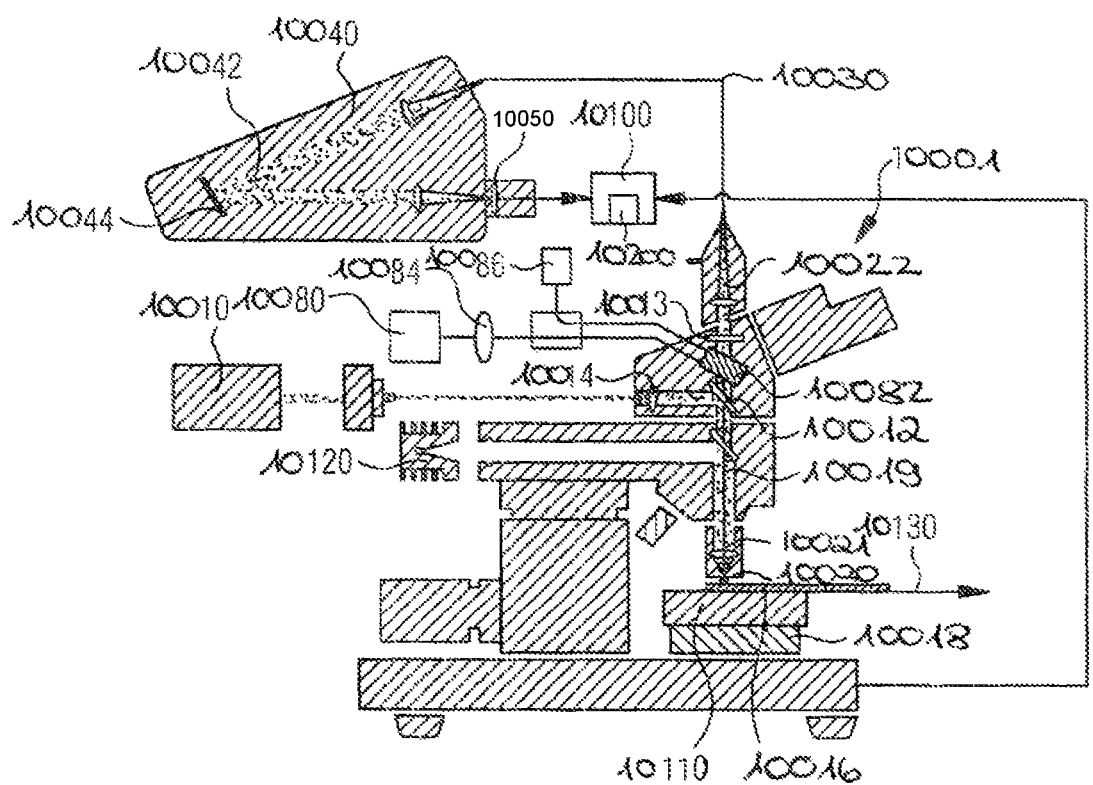
FIG. 9a shows the schematic structure of a Raman microscope having a first and a second light source, according to the second aspect of the invention wherein the beam path of first and second light sources is shown.

With regard to FIGS. 9a to 14 the embodiment of the invention according to the second aspect of the invention is described. FIG. 9a shows the schematic structure of a embodiment of a confocal Raman microscope for recording a sample surface. With the aid of confocal Raman microscopy, chemical properties and phases of liquid and solid components can be analyzed within the range of the resolution, which is limited by diffraction, of approximately 200 nm. Marking the sample, for example, using fluorescent materials as in fluorescence microscopy is not necessary. Due to the confocal structure, a depth resolution is provided, which enables the sample to be analyzed in depth, without having to carry out sections, for example.

In confocal microscopy, a punctiform light source, preferably a laser, is imaged on a point of the sample. Subsequently, this pixel is preferably focused using the same optical unit on a perforated screen, a so-called pinhole, in front of a detector. The size of the perforated screen has to be adapted in this case to the diffraction-limited imaging of the illumination image. The image is now generated in that a point of the illumination source is scanned relative to the sample. The sample is thus scanned point by point. Using this type of imaging, a substantial increase of the image contrast is achieved, because only the focal plane of the objective lens contributes to the imaging. In addition, the resolution can be reduced as a result of the folding of the diffraction point using the aperture of the perforated screen by approximately a factor of $\sqrt{2}$ to approximately $\lambda/3$. In addition, a three-dimensional image of the sample structure can be obtained having an axial resolution of approximately one wavelength.

With respect to confocal microscopy, reference is made, for example, to DE 199 02 234 A1.

FIG. 9a shows a possible structure of a confocal Raman microscope, for example, the microscope alpha300 R from Witec GmbH, D-89081 Ulm, Germany. In the confocal Raman microscope 1, the light of a first light source 10010 is guided at a beam splitter mirror 10012 after a beam widening 10014 in the direction of the sample 10016 on the sample table 10018. The light of the first light source, in particular the first laser, is preferably excitation light for Raman or fluorescence radiation and is in a wavelength range of 350 nm to 1000 nm, preferably 500 nm to 1000 nm.

The deflected light beam 10019 of the excitation light is focused in this case by a suitable optical unit 10021 on a substantially punctiform region 10020 on the sample 10016. The light of the first light source, in particular the laser light source, interacts with the material of the sample 10016. On the one hand, Rayleigh light, which is backscattered from the sample, of the same wavelength as the incident light occurs. This light is deflected via a beam splitter 10012 onto a cut-off filter or notch filter 10013 and does not reach into the detection optical unit.

The light having a different frequency or frequencies than the Rayleigh light emitted from the sample, namely the Raman light, passes through the beam splitter 10012. After the beam splitter 10012, the Raman light is identified with reference sign 10022. Via a pinhole (not shown), the Raman light 10022 is coupled into an optical fiber 10030 and reaches a spectrometer 10040. In the spectrometer 10040, the beam having Raman light is widened again by a suitable optical unit, resulting in the beam 10042, which is incident on a grating spectral filter 10044. The grating spectral filter 10044 diffracts the light according to its wavelength in different directions, so that a spectral signal can be recorded on the CCD chip 10050 depending on the location. The CCD chip 10050 has, for example, 1024 channels, so that the total of 1024 channels of the CCD chip can record light of different wavelengths.

The image of the sample arises by scanning in the x/y plane in the arrow direction 10130.

Light of a white light source 10120 can also be coupled onto the sample 10016 for alignment and/or for observation.

The confocal Raman microscope 10001 furthermore comprises a second light source 10080. The second light source 10080 is embodied in addition to the first light source of the confocal Raman microscope 10001. In the illustrated embodiment according to FIG. 9a, the second light source comprises a separate independent beam path, which is coupled via a dichroitic mirror 10082 into the optical unit 10021 of the objective lens. The beam path of the second light source is incident via the same optical unit 10021 as the excitation light source for Raman and/or fluorescence measurements of the first laser light source on the sample and is guided via a dichroitic mirror 10082 to a beam splitter, which allows light from the second light source to pass in the direction of the mirror 10082 and optical unit 10021 and couples out the light of the surface reflected back through the optical unit 10021, so that the light reflected back from the sample surface is guided to a photodiode 10086. The reflected signal is detected therein and supplied to an analysis unit (not shown). The analysis unit ascertains the phasing, which is a measure of the height change of the surface of the sample, from the reflected signal. Depending on the phasing, the sample table is then moved such that the sample is continuously located in the focal plane for the Raman and/or fluorescence microscopy. The movement of the sample table takes place in a scattered or regulated manner depending on the phasing of the lens control as described with regard to FIGS. 10a-10c.

Furthermore, an electrically focusable lens 10084 is introduced into the beam path after the second light source 10080, which lens is used to change the focal position of the second light source 10080. The electrically focusable lens can be, for example, the electrically tunable, i.e., focusable lens EL-16-40-TC from Optotune Switzerland AG, Bernstraße 388, CH-8953 Dietikon, which permits tuning in the range −2 to +3 diopters at 30° C. The aperture of the electrically focusable lens EL-16-40-TC is 16 mm, the transmission is in the wavelength range 450 nm to 950 nm and is greater than 90%. The described electrical lens is an example and is not restrictive. The content of the disclosure of the technical datasheet of the company Optotune Switzerland AG for the electrically tunable lens is also included by the content of the disclosure of the present application. The electrically focusable lens is preferably periodically excited, in particular at a frequency in the range of 200 to 500 Hz. The focal position of the second light source is periodically changed by the periodic excitation of the electrically focusable lens. Whenever the focal plane comes to rest in/on the sample, a signal is detected at the photodiode 10086. The phasing can be ascertained from this signal and the sample topography can be inferred. As a function of the phasing, the sample table is then moved so that the surface topography of the sample is compensated for and the sample is always located in the confocal plane for the Raman and/or fluorescence microscopy. This is described in detail in FIGS. 10a-10b.

FIG. 9b shows the schematic structure of a confocal Raman microscope, wherein the excitation radiation of the first light source 102010 or the laser for the Raman measurement is guided in parallel to the excitation radiation of the second light source 102080 for the topography measurement. Identical components as in preceding FIG. 1a are identified with reference signs increased by 102000. In the Raman microscope 102001 shown in FIG. 9b, both the light of the first light source 102010 for exciting the Raman effect and also the light of the second light source 102080 are focused by the same optical unit 10202 onto substantially the same region 102020 of the sample 102016. The focal position for the Raman measurement, i.e., the confocal focus of the excitation laser light of the first light source 102010, is selected for the excitation of the Raman effect. The light of the first light source 102010 is coupled in by means of a beam splitter 1020 in the direction of the sample 102016. In an alternative embodiment instead of a beam splitter a dichroitic mirror can be used. The dichroitic mirror is not shown in FIG. 9b. The light beam 102019 is deflected in the beam splitter 102012.1 in the direction of the sample 102016 and passes through the further beam splitter 102012.2. The Raman light which is generated by the sample by interaction passes through both the beam splitter 102012.1 and also the beam splitter 102012.2 and is identified after beam splitter 102012.2 with 102022. After beam splitter 102012.2, the light beam 102022 is focused on a pinhole 102013 in front of a detector (not shown). The light path of the second light source is identified with 102092. An electrically focusable lens 102094 is arranged in the light path from the second light source 102080 to the sample 102016.

In addition to the light of the light source 102010, which is used to excite the Raman effect in the sample, via the further beam splitter 102012.2, the light 102092 of the second light source 102080 is guided through the same optical unit 102029 as the light for exciting the Raman effect onto the sample 102016. The light beam is identified with 102019. The light of the second light source 102080 incident on the sample is reflected by the sample. The reflected light 102089 is again guided via the further beam splitter 102012.2 onto a beam splitter and guided from there onto a diode 102096. The signal recorded by the diode 102096 is fed to an analysis unit 102100. The analysis unit 102100 is simultaneously the regulator of the scanner, which is displaced in accordance with the signal of the photodiode in the z direction.

The diode 102096 which records the light signal is an e.g. InGaAs diode.

In order that both the light for exciting the Raman effect and also that of the second light source can pass through the same optical unit, it is advantageous if either different spectral ranges or a time-multiplex device is used. For example, the light of the second light source can be in the wavelength range from 1000 nm to 2000 nm and the light wavelength for exciting the Raman effect can be, for example, in the range from 350 nm to 1000 nm, for example, at 532 nm. Such a constellation would then enable recording Raman spectra generally above 532 nm. Of course, the selection of other wavelengths would also be conceivable. Alternatively to different wavelength ranges, the measurements could also be performed alternately in time and the analysis could then be performed in the time multiplex device.

The structure shown in FIG. 9b enables, with the aid of the second light source 102080 and the focusable, in particular the electrically focusable lens 102094, the sample surface to be brought in a regulated manner into the confocal plane for the Raman measurement. This can be done via actuators. The confocal plane for the Raman measurement corresponds to the first focal plane of the first light source. In order to bring the sample into the confocal plane for the Raman measurement, the reflected light of the sample is detected. From the detected light signal e.g. the topography of the sample can be determined. Based on the determined topography the sample could be hold in the focal plane by adjusting al least one of the sample table, the light source and the objective lens.

In addition to the regulation/control for the Raman measurements, solely a topography measurement alone is also possible. The contactless topography measurement is particularly well suitable for samples, the topography of which is already excessively tall for the AFM (>5 μm) or the lateral structures of which are much larger than the typical scanning ranges of piezo scanners (100 μm).

Figure 10A:
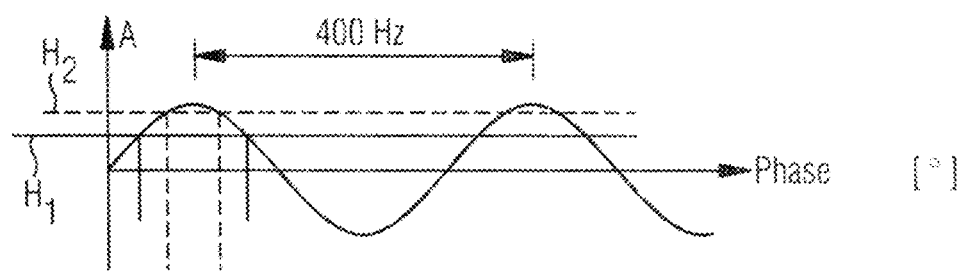
FIGS. 10a-10b show modulation of the electrically focusable lens and detected signals for the second light source.
Figure 10B:
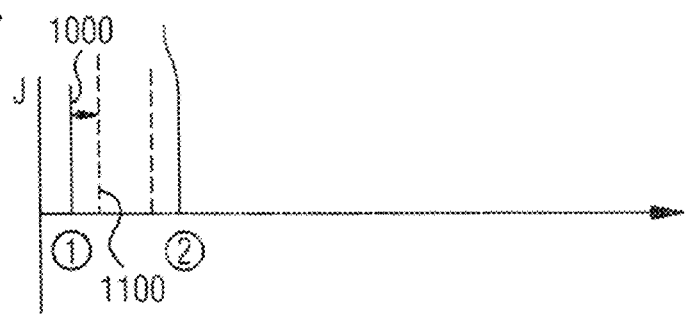
Figure 10D:
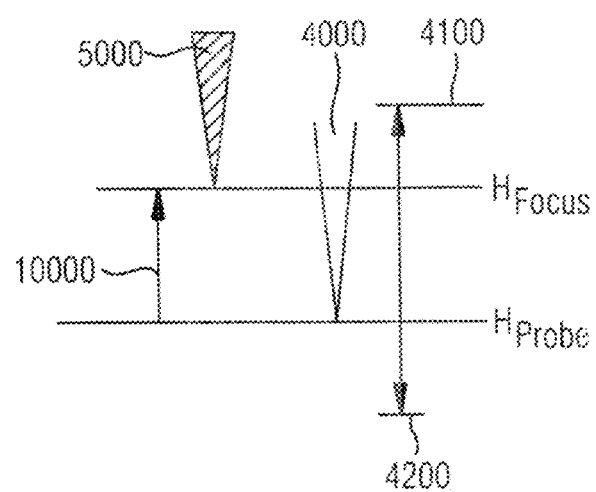
FIG. 10c shows a schematic illustration of the foci of the first and second light source and also an uneven sample surface.
Figure 22:
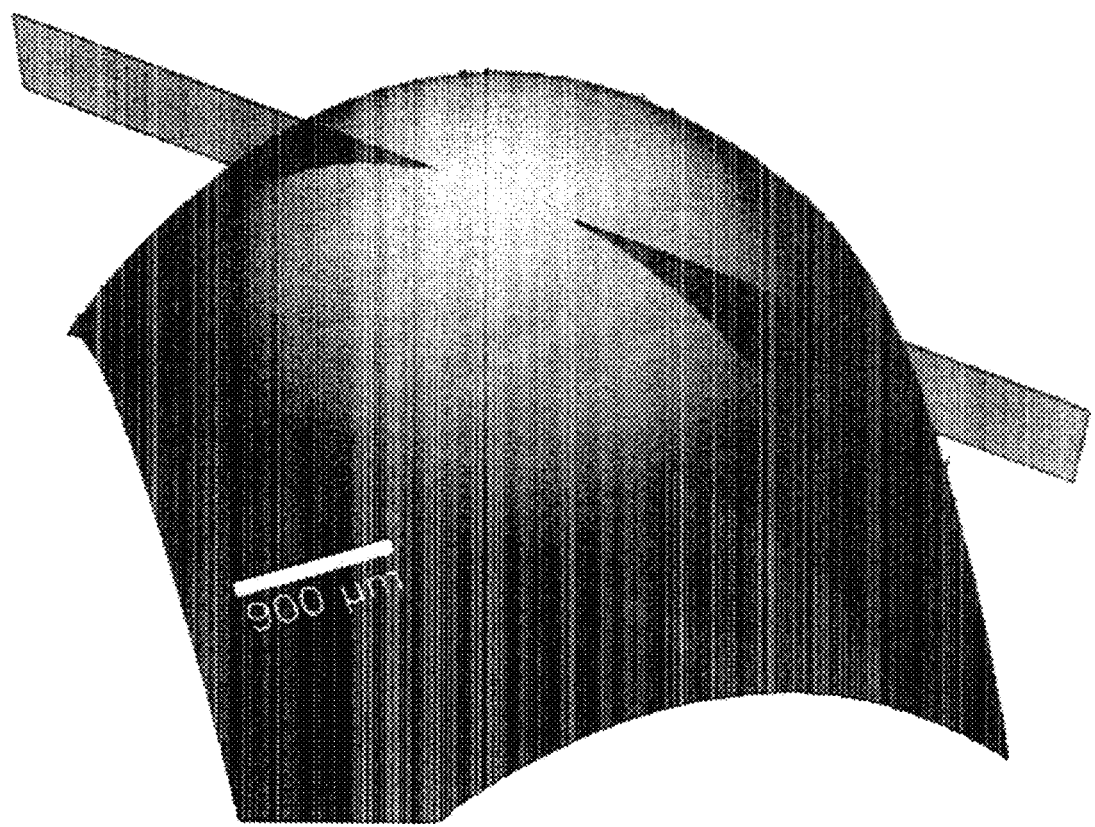

FIG. 10a shows the sinusoidal modulation of the focus of the lens of the second light source. The selected frequency of the modulation is 400 Hz in the present exemplary embodiment. Due to the sinusoidal modulation of the focus of the lens, the focal position of the second light source is also passed through sinusoidally, as shown in FIG. 10a. Two heights of the surface to be studied are shown in FIG. 10a in the sinusoidally modulated curve. The first height is identified with H1, and the second height with H2. When the sinusoidally extending focus of the second light source comes to rest on the surface of the sample at the height H1, the confocal condition is met and the signal 101000 shown in FIG. 10b is detected at the diode. The phasing of the signal 101000 is approximately 15°. If the height of the sample increases, for example, due to thermal expansion, the height thus shifts from H1 to H2. Now, instead of the signal 101000, the signal 101100 is detected. As can be deferred from FIG. 10b, the signal 101100 is shifted to the right in relation to the signal 101000, the phasing of the signal 101100 is at 30°, and the difference in the phasing of the first and second signals is 15°. The signal 101100 is again detected when the focus of the second light source comes to rest on the surface at the height H2. The shift of the phasing of the signal of the second light source which is detected at the diode is therefore a measure of how the height of the sample changes and can be used as a positioning variable or as a control variable for a control or regulation of the sample, to compensate for a height difference of the sample and to bring the sample into the focal plane of the first light source for the Raman and/or fluorescence microscopy. As shown in FIG. 10b, the signals at the photodiode travel to the right (signal group 1) and also to the left (signal group 2) in the event of a height change H1 to H2 from 101000 to 101100. For regulation, however, only the shift in one direction is used, in the present case the shift to the right according to signal group 1.

FIG. 10c shows a sample having a height $H_{sample}$ ($H_{probe}$), wherein the height $H_{sample}$ ($H_{probe}$) is below the height of the focus Hfocus for the Raman microscopy. The focus of the second light source is identified with 104000, it is modulated sinusoidally, for example, in the capture range between the limits 104100 and 104200. The height of the sample Hsample can thus be ascertained from the focal position of the second light source. If the height has decreased, as in the example shown, as a result of a depression from Hfocus to Hsample, for example, the focus 105000 of the Raman measurement would thus be located outside the sample. Due to the sinusoidal modulation between the limits 104100 and 104200 of the focal position of the second light source, the height Hsample is detected and, based on the phasing, the sample is brought back into the focus 105000 of the Raman measurement by means of a control or regulation. The displacement of the sample from Hsample to Hfocus is identified with 100000.

FIG. 11 shows a topography of a sample. The sample has an extension in the x direction of 5000 μm. The sample is curved in the z direction with a depth of ±30 μm.

Figure 12:
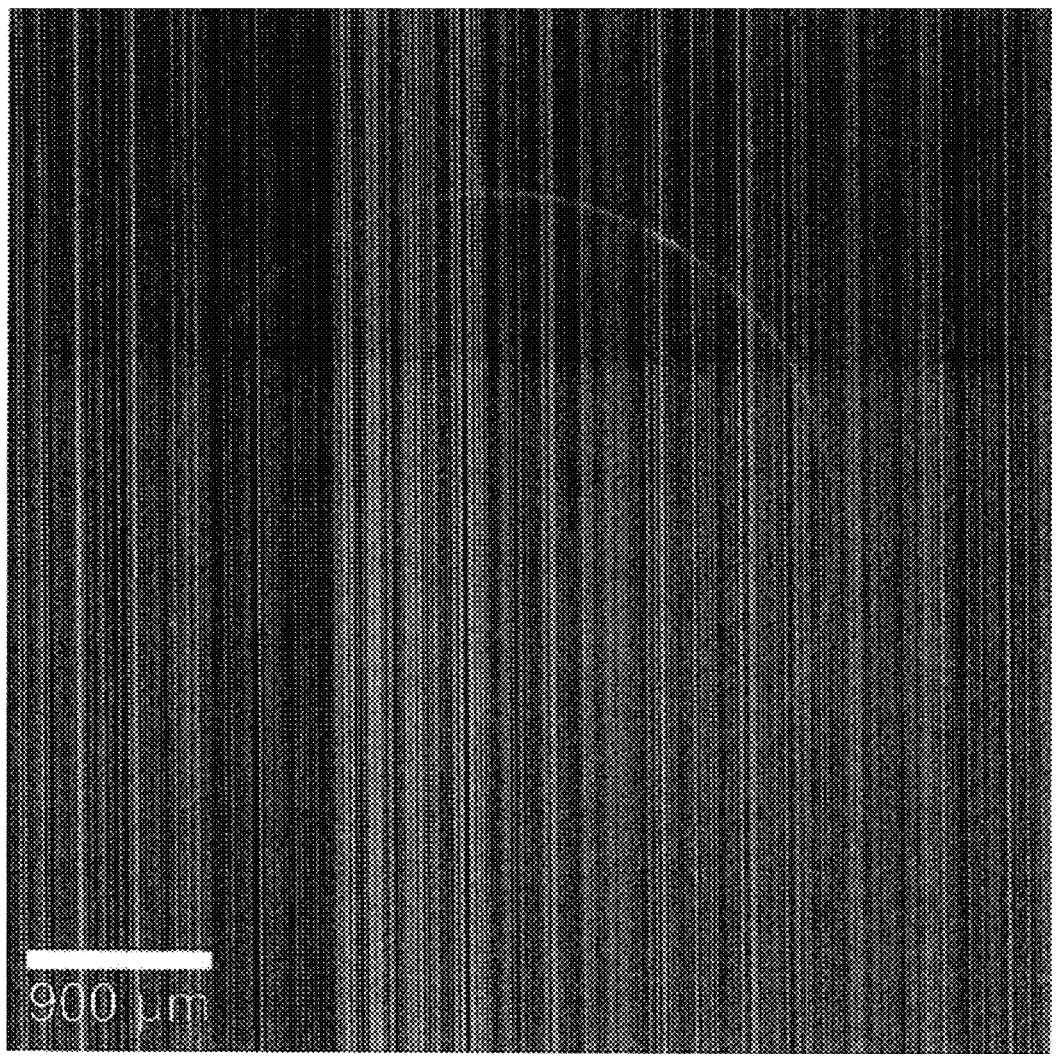
FIG. 12 shows imaging of the sample according to FIG. 11 without regulation, which brings the sample into the confocal plane of the Raman and/or fluorescence microscopy.

FIG. 12 shows the imaging of the sample according to FIG. 11 using confocal Raman microscopy, wherein the sample was not moved and no regulation of the sample into the confocal plane has taken place. It can be seen clearly that only a narrow edge region of the sample is in the focus of the Raman measurements, so that only this region is sharply imaged.

Figure 13:
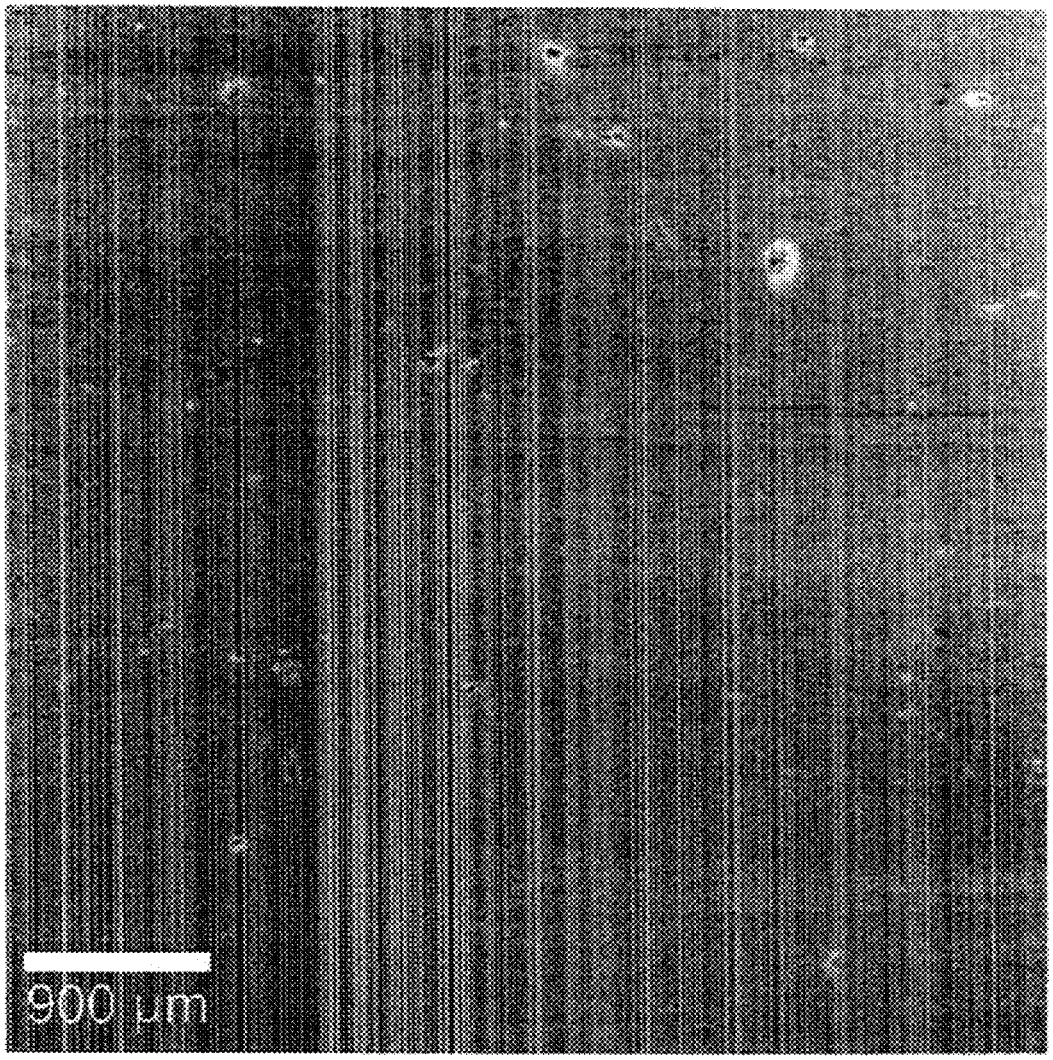
FIG. 13 shows imaging of the sample according to FIG. 11 with regulation, which brings the sample into the confocal plane of the Raman and/or fluorescence microscopy.

FIG. 13 shows the Raman measurement on a surface according to FIG. 11. In contrast to FIG. 12, the sample is brought into the confocal plane in a regulated manner by means of the focus of the second light source, so that a uniformly illuminated image is obtained.

FIG. 14 shows the effect of the regulation according to the invention. In FIG. 14, the curve of the surface of the sample is shown with 102000. The surface of the sample has a depth of 100 μm. The curve 102100 represents the Raman intensity without regulation. As can be inferred from the curve 102100, Raman signals only occur when the sample is located in the confocal plane for the Raman measurements. This is the case for exactly two values of the surface. The higher or lower regions of the surface are outside the resonance and do not display any signal. However, it is possible with the aid of the second light source, by way of the regulation according to the invention with the aid of the analysis of the focal position of the second light source, to always guide the surface into the confocal plane of the Raman and/or fluorescence measurement, so that a Raman signal 102200 is detected over the entire sample.

In the invention, a device is provided for the first time that makes it possible to easily and quickly obtain information about the surface topography. In particular, this is achieved with the assistance of a chromatic sensor that in turn can be combined with optical measuring methods, for example with confocal Raman microscopy. Alternately, the surface topography can be determined with the assistance of modulating the sample in the z direction.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A device for imaging a surface of a sample having a surface topography, comprising:
    an optical axis;
    an objective lens;
    a light source operably arranged relative to the objective lens to form a substantially punctiform image at a focal plane and to excite a light radiation from the sample;
    a detector operably arranged relative to the objective lens to receive and detect the excited light radiation from the sample;
    a sample table disposed adjacent the objective lens and generally at the focal plane and that movably supports the sample in three orthogonal directions;
    an analysis unit operably connected to the sample table to control a movement of the sample table;
    the analysis unit including a mechanism configured to periodically move the focal plane with a modulation amplitude and period along the optical axis;
    wherein the detector is configured to detect reflected and/or scattered and/or emitted light from the surface as the focal plane is moving and generate a light signal; and
    a controller configured to determine a topography of the surface from the light signal and maintain the surface of the sample substantially in the focal plane based on the determined surface topography by adjusting at least one of the sample table, the light source and the objective lens;
    wherein the device is configured to perform a Raman and/or Rayleigh measurement and determine a maximum Raman and/or Rayleigh intensity;

wherein the modulation amplitude is greater than the highest sample topography and greater than a position of the determined maximum Raman and/or Rayleigh intensity.

2. The device of claim 1, wherein the controller provides a position signal to the analysis unit and the analysis unit adjusts a relative position between microscope optics and the sample table in response to the position signal.

3. The device of claim 1, wherein the device is configured to perform the Raman and/or a fluorescence measurement concurrently with the determination of surface topography by the controller.

4. The device of claim 1, wherein the light source includes a laser.

5. The device of claim 1, wherein the controller is configured to determine the surface topography by identifying locations of maximum intensity in the detected light signal by moving the focus periodically through the sample surface.

6. The device of claim 1, wherein the mechanism is configured to minimize a magnitude of the periodic movement by tracking a location of maximum intensity in a detected light signal of the detector.

\* \* \* \* \*